United States Patent
Wu et al.

(10) Patent No.: US 12,028,509 B1
(45) Date of Patent: Jul. 2, 2024

(54) DIFFRACTION-LIMITED OPTICAL TARGET SYSTEM WITH CONTINUOUSLY-VARIABLE VIRTUAL DISTANCE

(71) Applicant: MLOptic Corp, Redmond, WA (US)

(72) Inventors: Pengfei Wu, Bellevue, WA (US); Zhengyuan Wang, Nanjing (CN)

(73) Assignee: MLOptic Corp., Redmond, WA (US)

( * ) Notice: Subject to any disclaimer, the term of this patent is extended or adjusted under 35 U.S.C. 154(b) by 16 days.

(21) Appl. No.: 18/528,135

(22) Filed: Dec. 4, 2023

(51) Int. Cl.
*H04N 17/00* (2006.01)
*G01B 11/25* (2006.01)
*G01M 11/02* (2006.01)
*G02B 13/22* (2006.01)
*G02B 27/00* (2006.01)

(52) U.S. Cl.
CPC ........... *H04N 17/002* (2013.01); *G01B 11/25* (2013.01); *G01M 11/02* (2013.01); *G01M 11/0207* (2013.01); *G01M 11/0214* (2013.01); *G01M 11/0221* (2013.01); *G02B 13/22* (2013.01); *G02B 27/0012* (2013.01)

(58) Field of Classification Search
CPC .. H04N 17/002; G02B 13/22; G02B 27/0012; G01M 11/02; G01M 11/0207; G01M 11/0214; G01M 11/0221; G01B 11/25
See application file for complete search history.

(56) References Cited

U.S. PATENT DOCUMENTS

| | | | | |
|---|---|---|---|---|
| 5,363,241 | A * | 11/1994 | Hegg | G02B 25/008 348/E13.032 |
| 7,248,716 | B2 * | 7/2007 | Fein | G06T 3/40 359/326 |
| 9,874,760 | B2 * | 1/2018 | Hua | G02B 30/22 |
| 10,704,984 | B2 * | 7/2020 | Kang | G02B 27/0012 |
| 11,825,070 | B1 * | 11/2023 | Thomas | G06T 7/80 |
| 11,892,609 | B1 * | 2/2024 | Wu | G02B 13/22 |
| 2018/0239152 | A1 * | 8/2018 | Kuo | G02B 27/0149 |
| 2019/0187354 | A1 * | 6/2019 | Kuo | G02B 27/0172 |
| 2022/0381678 | A1 * | 12/2022 | Jensen | G01N 21/94 |
| 2024/0048684 | A1 * | 2/2024 | Murphy | G06T 7/97 |

* cited by examiner

*Primary Examiner* — Brian P Yenke
(74) *Attorney, Agent, or Firm* — Jong Patent Firm; Cheng Ning Jong; Tracy P. Jong

(57) ABSTRACT

An optical target system for a device under test disposed in an optical path, the optical target system including a pupil, a lens system and a target configured to be adjustable in position along the optical path such that the object distance of the target with respect to the lens system, is adjustable, the lens system is disposed between the pupil and the target along the optical path, wherein a first virtual image cast behind the target is of a first size when the target is disposed at a first position along the optical path, a second virtual image cast behind the target is of a second size when the target is disposed at a second position along the optical path.

20 Claims, 43 Drawing Sheets

| Surface # | Radius of curvature (mm) | Thickness (mm) | Refractive index | Abbe number | Lens elements |
|---|---|---|---|---|---|
| 0 | Infinity | VID | | | Virtual image |
| 1 | Infinity | 50.000 | | | Stop |
| 2 (A2) | -45.410 | 5.000 | 1.569 | 71.304 | Singlet |
| 3 (A3) | -29.696 | 14.054 | | | |
| 4 (B4) | -16.112 | 6.000 | 1.755 | 52.322 | Doublet |
| 5 (B5) | -19.600 | 5.500 | 1.569 | 71.304 | |
| 6 (B6) | -21.726 | 17.211 | | | |
| 7 (C7) | 1588.144 | 5.000 | 1.569 | 71.304 | Doublet |
| 8 (C8) | -24.777 | 2.000 | 1.755 | 52.322 | |
| 9 (C9) | 66.932 | 4.237 | | | |
| 10 (D10) | 77.078 | 6.000 | 1.569 | 71.304 | Singlet |
| 11 (D11) | -41.044 | | | | |

*FIG. 4*

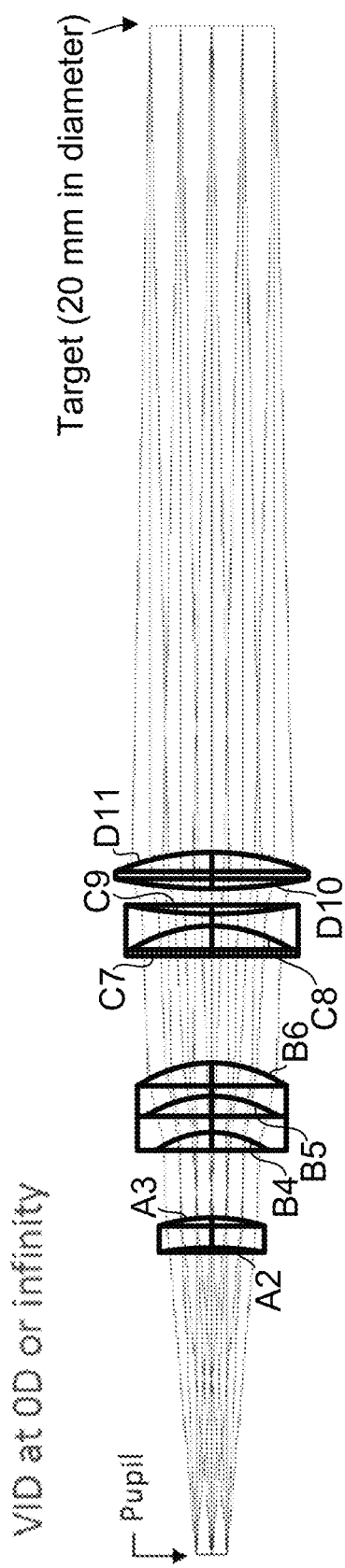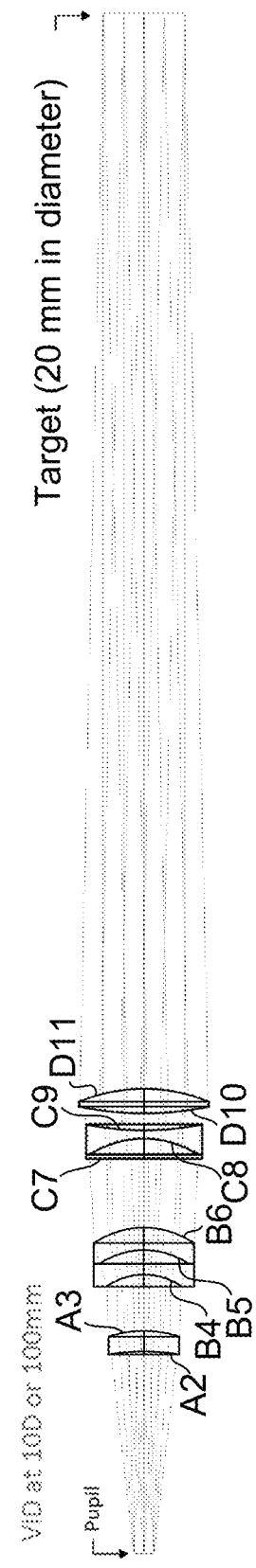

| Object (mm) | 100 | 125 | 166.7 | 250 | 500 | 1000 |
|---|---|---|---|---|---|---|
| VID (mm) | -100 | -125 | -166.7 | -250 | -500 | -1000 |
| VID (diopter) | -10D | -8D | -6D | -4D | -2D | -1D |
| Target Semi Dia. (mm) | 10.003 | 10.004 | 10.006 | 10.006 | 10.006 | 10.004 |

| Object (mm) | infinity | -1000 | -500 | -250 | -166.7 | -125 | -100 |
|---|---|---|---|---|---|---|---|
| VID (mm) | infinity | 1000 | 500 | 250 | 166.7 | 125 | 100 |
| VID (diopter) | 0D | 1D | 2D | 4D | 6D | 8D | 10D |
| Target Semi Dia. (mm) | 10.003 | 10.002 | 10.002 | 10.002 | 10.002 | 10.003 | 10.004 |

FIG. 10

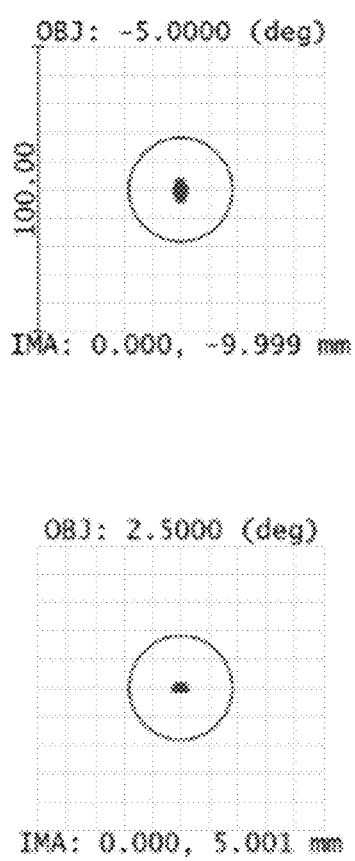
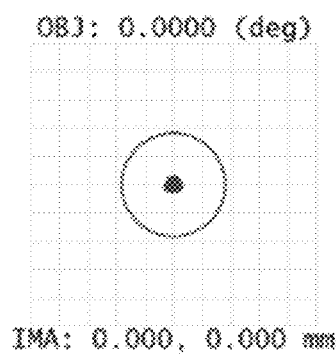
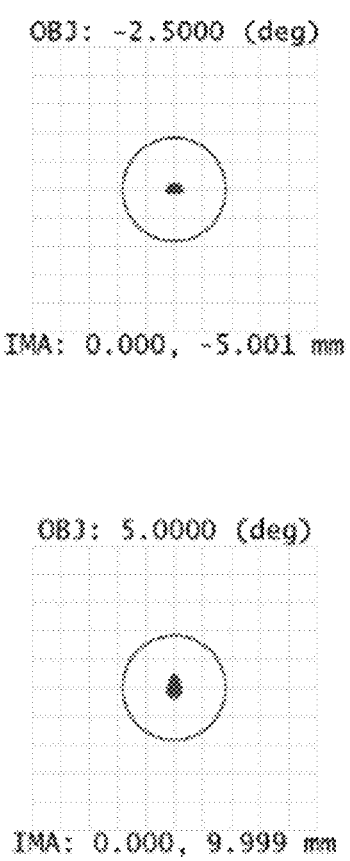
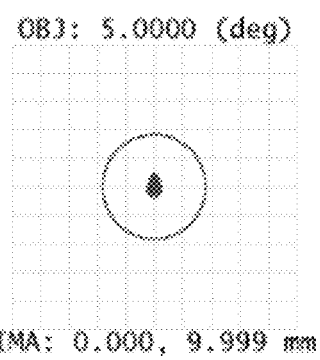
FIG. 27

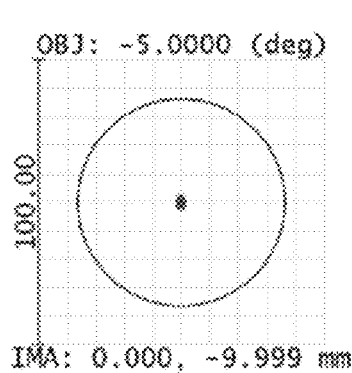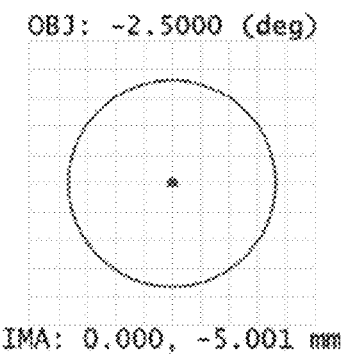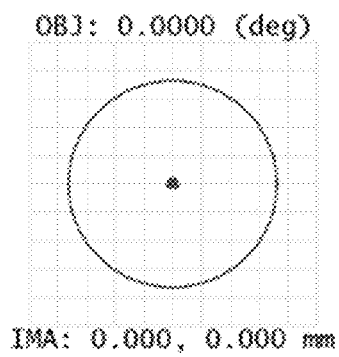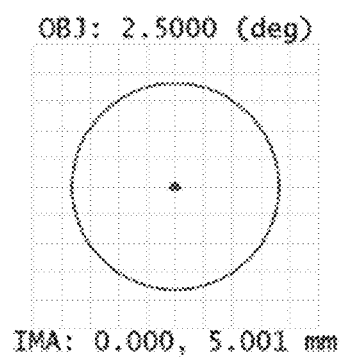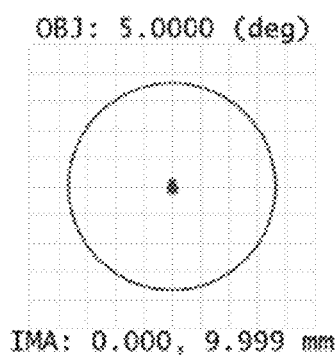
FIG. 31

Cross Image Diagram

DIFFRACTION-LIMITED OPTICAL TARGET SYSTEM WITH CONTINUOUSLY-VARIABLE VIRTUAL DISTANCE

BACKGROUND OF THE INVENTION

1. The Field of the Invention

The present invention relates to an optical target suitable for testing a plurality of different devices under test requiring optical targets of different sizes. More specifically, the present invention is directed to an optical target capable of producing variable virtual images at continuously-variable virtual distances.

2. Background Art

A standard target refers to a well-defined object or pattern used as a reference point for accurately measuring and aligning virtual objects within an extended reality (XR) environment. The primary purpose of a standard target in XR metrology is to establish a reliable and consistent coordinate system between the real world and the virtual world. This is crucial for ensuring accurate measurements, alignments and interactions within an augmented space. A standard target for XR metrology typically possesses known dimensions, high contrast and unique features, geometric accuracy, position and orientation markers, compatibility and repeatable performance, etc. The physical dimensions of the target should be precisely known, allowing for accurate scaling and measurement of virtual objects in relation to the real world. The target should have distinct visual features with high contrast that can be easily identified by the XR metrological system. For example, the target may come with high-contrast line pairs (lp) with various spatial frequencies (lp/mm) or slanted black/white edge for modulation transfer function (MTF) measurements. The geometry of the target should be well-defined and stable, e.g., the target may include checkerboard, grids, circle, crosshair, star, or any specifically-designed patterns and fiducial markers for various metrology applications such as distortion correction, alignment, as well as identifying focusing errors, astigmatism and other aberrations, etc. The target often includes markers or reference points that indicate specific positions and orientations. These markers help in calibrating the XR system and aligning virtual objects accurately. The target should be compatible with the metrological technology and software used in the XR system to ensure that the measurements and alignments are consistent and reliable. The features and properties of the target should remain consistent over time and across different instances. This is important for achieving consistent and accurate metrology results. The specific choice of a target depends on the application, the technology being used and the level of accuracy required. It is important to note that the field of XR and its technologies are rapidly evolving. Due to the diversity of targets and rapid advances in XR technology, there is a demand for innovative standard targets that can serve multiple applications in XR metrology and technology. Similar to a physical target used in the real world to establish a reliable coordinate system for accurate measurements, a standard target in XR metrology fulfills a similar role within the virtual or augmented environment to serve as a reference point for accurate measurements, alignments and interactions. As such, the XR target should have known precise dimensions, positions, and orientations, providing a reference frame for accurate measurements and alignments. The XR target's location and orientation are also crucial for aligning virtual objects with the real world or other virtual objects. Proper placement ensures accurate interactions and measurements. It should also come with high contrast, unique patterns and clear geometry aid in accurate tracking and alignment. Current standard targets are mostly physical ones (or real targets) such as printed targets, screens, chrome on glass targets and they are commonly used in traditional optical metrology and measurements. The physical target can only be placed at a certain distance, e.g., at 1-m object distance as a real object. Due to the limited dimension of the physical target, it is impractical for the target to be placed at infinity or a great distance since the image will become too small and cannot be resolved by a metrological system or an XR device under test (DUT). Further, in existing optical target systems, no virtual targets have been created based on the physical ones. There are some equipment and testing systems used for image quality testing, active optical alignment and various component testing during assembly. These instruments can also produce various targets including virtual ones for different measurements and applications. However, most of them are very costly and designed specifically only for certain applications especially for measurements of conventional optics and systems, rather than for XR metrology.

In order for an optical target system to be useful for a plurality of DUTs and a target that can be placed at different object distances, especially for long distances or virtual imaging distances (VIDs), a lens system is required to have diffraction-limited performance to eliminate any possible degradations of the target optical quality. It is also desirable that the physical target be unchanged while producing VID changes, e.g., the target can provide the same angular resolution, e.g., line pairs/degree (lp/degree), at various VIDs. This requires a specific lens design in addition to the diffraction-limited performance. For XR metrology, the target should be compact with a variable aperture matching a human eye pupil size of from 2-5 mm in diameter. In addition, it may also be helpful if the target pattern can be changeable or switchable, enabling a single target system for a variety of application scenarios in XR metrology.

There exists a need for an optical target system capable of continuously-variable virtual distances such that the same optical target system may be used with a plurality of DUTs requiring different virtual images disposed at different VIDs.

SUMMARY OF THE INVENTION

In accordance with the present invention, there is provided an optical target system for a device under test (DUT) disposed in an optical path, the optical target system including:

(a) a pupil;
(b) a lens system; and
(c) a target configured to be adjustable in position along the optical path such that the object distance of the target with respect to the lens system, is adjustable, wherein the lens system is disposed between the pupil and the target along the optical path, wherein a first virtual image cast behind the target is of a first size as viewed through the pupil along the optical path by the DUT when the target is disposed at a first position along the optical path, a second virtual image cast behind the target is of a second size as viewed through the pupil along the optical path by the DUT when the target is disposed at a second position along the optical path, the first virtual image and the second virtual image are disposed at an identical field of view (FOV) and the first size is different from the second size.

In one embodiment, the optical target system further includes a uniform light source configured to be disposed behind the target. In one embodiment, the lens system includes an object-space telecentric imaging lens. In one embodiment, the target includes a display. In one embodiment, the target can be a micro organic light-emitting diode (microOLED), a reflective spatial light modulator (SLM) or a transmissive SLM. In one embodiment, the optical target system further includes a linear stage for receiving the target, wherein the linear stage is configured to allow adjustment of a location of the target with respect to the lens system along the optical path. In one embodiment, the linear stage is a motorized linear stage. In one embodiment, the target is configured to be removably received in a target holder. In one embodiment, the pupil includes a diameter of about 2 to 5 mm. In one embodiment, the target is configured to be adjustable in position along the optical path in a continuously-variable manner. In one embodiment, the DUT is a camera. In one embodiment, the lens system includes two singlets and two doublets and an optical path is configured to be formed in an order of a first of the two singlets, the two doublets and a second of the two singlets.

An object of the present invention is to provide an optical target system useful for a plurality of DUTs which require different virtual images to be disposed at different virtual distances (VIDs).

Another object of the present invention is to provide an optical target system useful for a plurality of DUTs which require different virtual images to be disposed at different VIDs and where the same physical target can be used for the different virtual images disposed at different VIDs.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 is a table listing an exemplary set of optical data suitable to form the lens system shown in FIG. 3.

FIG. 6 is a diagram depicting a VID of a target at 0D or infinity.

FIG. 7 is a diagram depicting a VID of a target at 10D or 100 mm.

FIG. 10 is a table depicting the size of a target being projected that remains unchanged when the VID changes when the present lens system is an object-space telecentric imaging lens.

FIG. 27 depicts spot diagrams corresponding to the diffraction-limited MTF shown in FIG. 26.

FIG. 31 depicts spot diagrams corresponding to the diffraction-limited MTF shown in FIG. 30.

PARTS LIST

Figure 1:
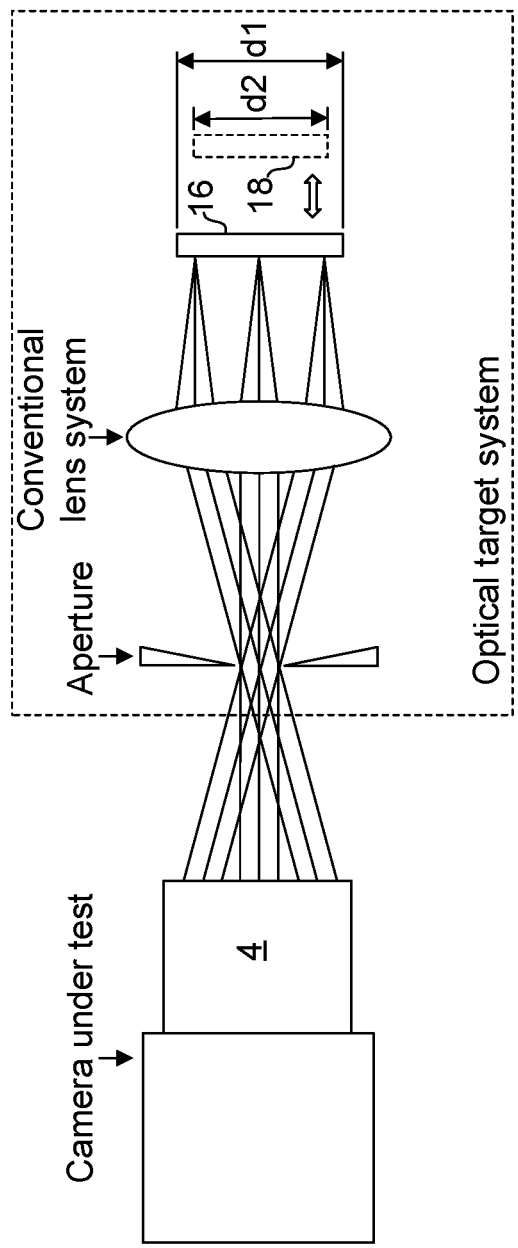
FIG. 1 is a diagram depicting one embodiment of a conventional optical target system.

2—optical target system
4—device under test, e.g., camera
6—pupil or aperture
8—lens system
10—target
12— first virtual image
14—second virtual image
16—target
18—target
20—target
22— uniform light source
24—target fixed holder
26—motorized stage
28—field of view (FOV)

PARTICULAR ADVANTAGES OF THE INVENTION

The present optical target system offers a compact universal target disposed at various virtual distances (VIDs) compared to a conventional optical target system which requires a new physical target for a different VID. Extended reality (XR) metrology requires the field of view (FOV) and angular resolution to be maintained, in addition to diffraction-limited modulation transfer function (MTF) performance. The present optical target system meets these criteria while allowing the use of a fixed-sized target, enabling its use for various devices under test (DUTs) requiring various VIDs, removing the need for replacing the target for a new target suitable to meet a new VID requirement and the angular resolution expressed in line pairs/degree (lp/deg) as required in, e.g., XR metrology. Therefore, with a single physical target, numerous virtual images that have identical angular resolution, i.e., the same lp/degree, for all different VIDs, from +/−10D to infinity continually. The present optical lens system ensures the absolute accuracy of measurements with multi-feature implementation, e.g., MTF measurements, precise optical alignments and various calibrations across FOV with continuous broad VID coverage. The diffraction-limited resolution of the optical lens system provides the highest accuracy of measurements capable of discerning tiny spatial and angular deviation. Further, the optical lens system provides telecentric imaging, enabling the target size in object space and/or the target angular resolution in image space to remain unchanged when the object distance or VID is changed. The present lens system provides extremely long VID ranges or object distances from 0D to at least +/−10D (or +/−100 mm) to infinity. The FOV covers a proper angular range required for XR metrology and vision measurements, as well as the range matching CIE 1964 10° Standard Observer for chromaticity or luminance calibration. The present optical target system is compact and lightweight and it is possible to create any type of targets for a variety of applications, especially for XR applications to evaluate the optical quality and alignment of a DUT. The present optical target system can also be used to simulate any devices or systems that produce virtual images such as holographic waveguides, light engines or micro-display modules, XR glasses and systems and head-up display (HUD) systems, etc.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 2:
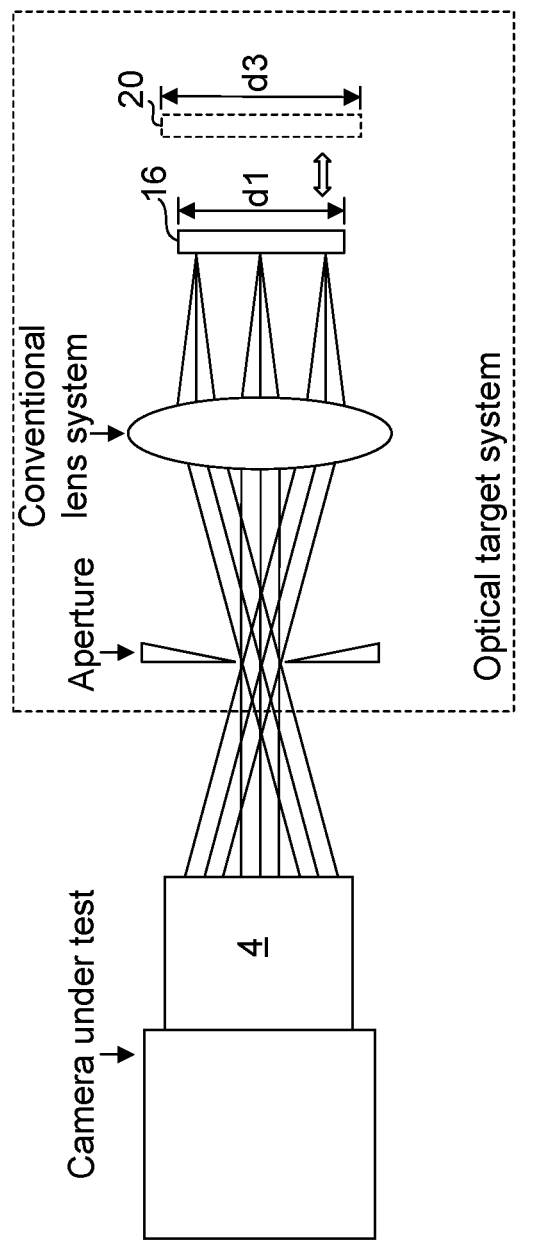
FIG. 2 is a diagram depicting one embodiment of a conventional optical target system.

FIG. 1 is a diagram depicting one embodiment of a conventional optical target system. For a desired target at a unique virtual image distance (VID), a uniquely-sized target may be required to be disposed at a unique object distance as shown in FIG. 1 as a smaller target 18 in dashed line. FIG. 2 is a diagram depicting another embodiment of a conventional optical target system. Here, again, it shall be noted that for a desired target at a unique VID, another uniquely-sized target may be required to be disposed at another unique object distance as shown in FIG. 2 as a larger target 20 in dashed line. Therefore, for a unique device under test 4 (DUT), the physical target may need to swapped out and replaced with a different and unique physical target suitable for the particular DUT. If a target is required to be disposed at several VIDs, a multitude of physical and different targets would be required, as each only serves as a unique target for a VID.

Figure 3:
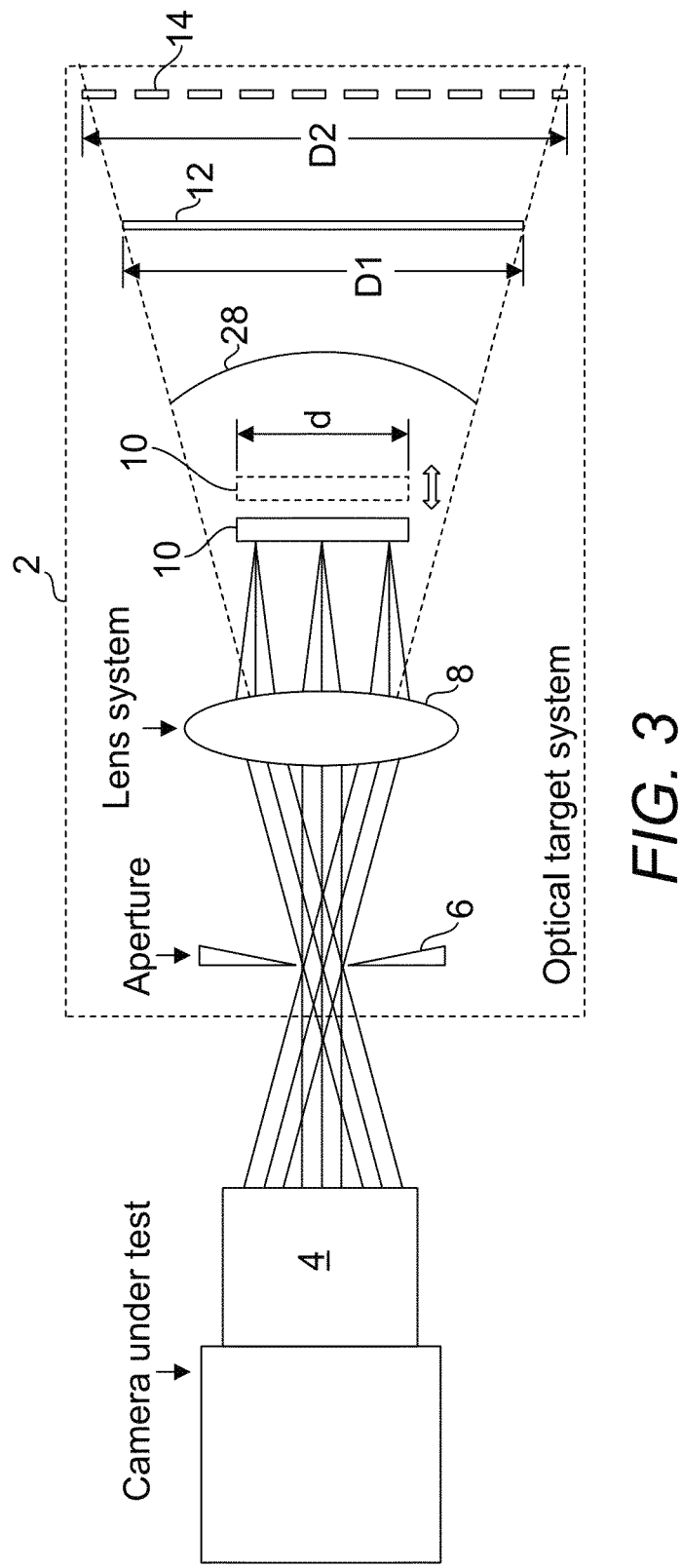
FIG. 3 is a diagram depicting one embodiment of a present optical target system.

FIG. 3 is a diagram depicting one embodiment of a present optical target system 2. The optical target system 2 serves as a target for a DUT, e.g., camera, disposed in an optical path aligned with the optical target system 2. The optical target system 2 includes a pupil 6, a lens system 8 and a target 10. The target 10 is configured to be adjustable in position along the optical path such that the object distance of the target with respect to the lens system, i.e., the distance between a principal plane of the lens system and the target 10, is adjustable. It shall be noted that the lens system 8 disclosed in FIG. 3 is a representation of a lens system suitable for the present optical target system 2 and does not necessarily include only a single lens. The lens system 8 is disposed between the pupil 6 and the target 10 along the optical path. When the target 10 is disposed at a first position along the optical path, a first virtual image 12 of a first size is cast behind the target as viewed through the pupil 6 along the optical path by the DUT. When the same target is disposed at a second position along the optical path, a second virtual image 14 of a second size is cast behind the target as viewed through is the pupil along the optical path by the DUT. It shall be noted that although the first virtual image 12 and the second virtual image 14 may be projected at different sizes at different positions along the optical path, they are disposed at an identical field of view (FOV). For extended reality (XR) metrology, the target should be compact with a variable aperture or pupil matching a human eye pupil size or diameter of from about 2 mm-5 mm in diameter.

Figure 5:
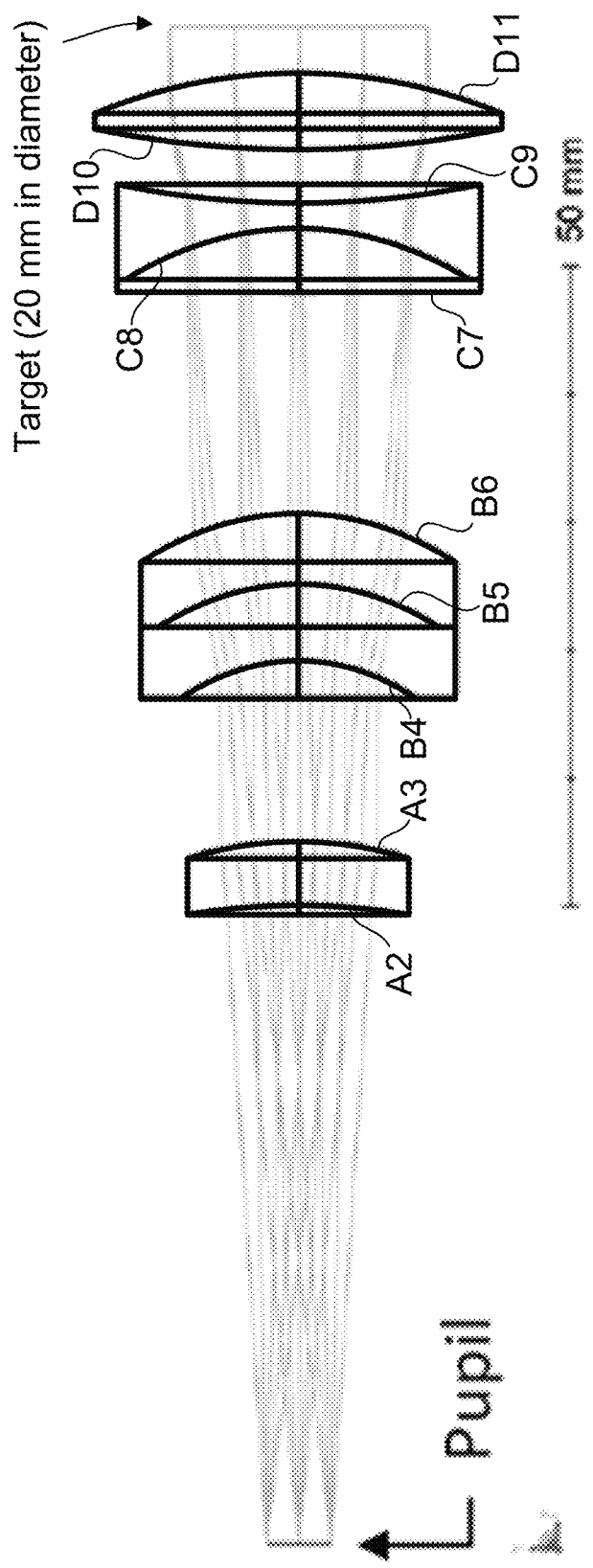
FIG. 5 is a diagram depicting a virtual image distance (VID) of a target at −10D or −100 mm.

FIG. 4 is a table listing an exemplary set of optical data suitable to form the lens system shown in FIG. 3. In one embodiment, the lens system 8 includes an object-space telecentric imaging lens to result in the use of the same-sized target to achieve numerous virtual targets disposed at various VIDs with the same angular resolution and FOV maintained. In one embodiment, the lens system includes two singlets and two doublets and an optical path is configured to be formed in an order of a first of the two singlets, the two doublets and a second of the two singlets. The first of the two singlets provides surface A2 and surface A3. The first doublet which provides surface B4 to surface B6, corrects spherical, coma and field curvature from the first singlet. The second doublet which provides surface C7 to surface C9, corrects axial and later colors, distortion as well as remaining aberrations. The second singlet which provides surface D10 to surface D11, further corrects all the remaining aberrations. As viewed through the pupil and this lens system, the target appears object-space telecentric and diffraction-limited. As such, only one target is required for many VIDs. As the required target size, d, is unchanged, the same target can be used when a different VID is required, to achieve the same dimension per angle, e.g., line pairs/deg, for the is different VID, a characteristic that is critical for MTF measurements. In one example, the effective focal length (EFFL) of the present lens system is about 114.55 mm and the angular FOV is about 10 degrees. The working distance, i.e., the entrance pupil 6 to the first front lens is about 50 mm while the total length from the first to the last optics surface is about 65 mm. The present lens system 8 is configured for a virtual image distance from at least +/−10D to infinity. FIG. 5 is a diagram depicting a VID of a target at −10D or −100 mm. FIG. 6 is a diagram depicting a VID of a target at 0D or infinity. FIG. 7 is a diagram depicting a VID of a target at 10D or 100 mm.

Figure 8:
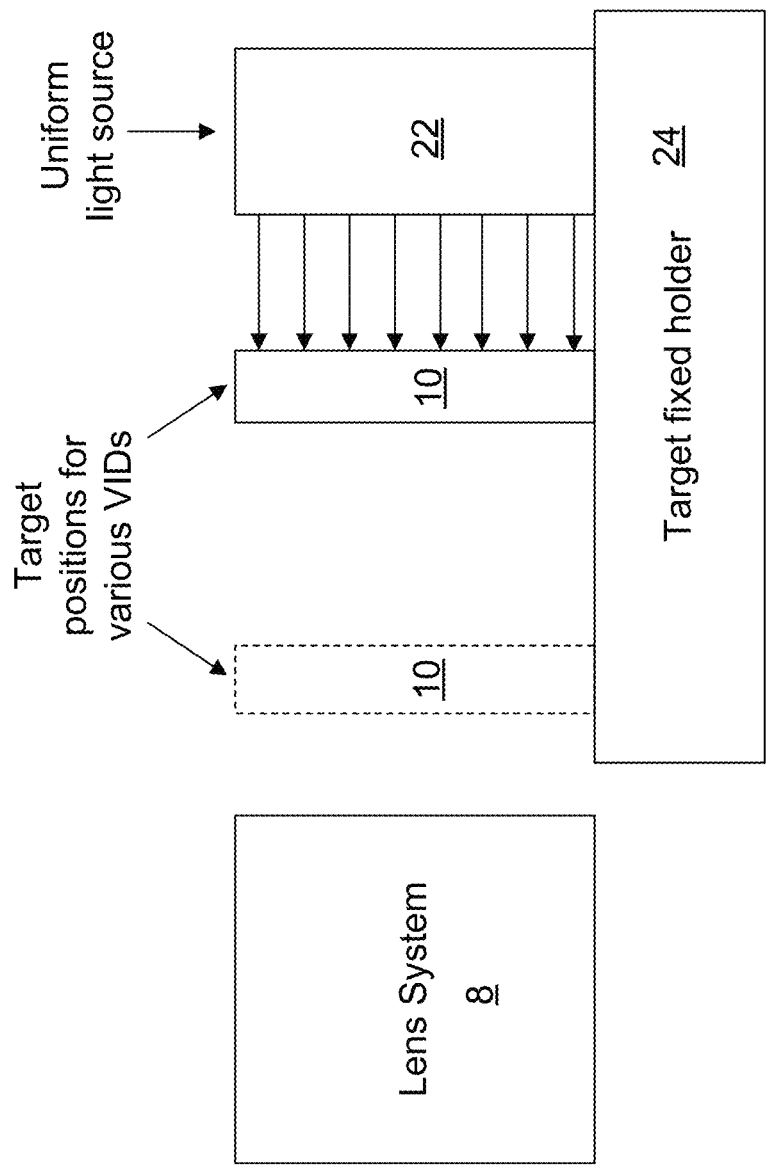
FIG. 8 is a diagram depicting a target that can be installed on a fixed holder with a series of positions calibrated for different VIDs.
Figure 9:
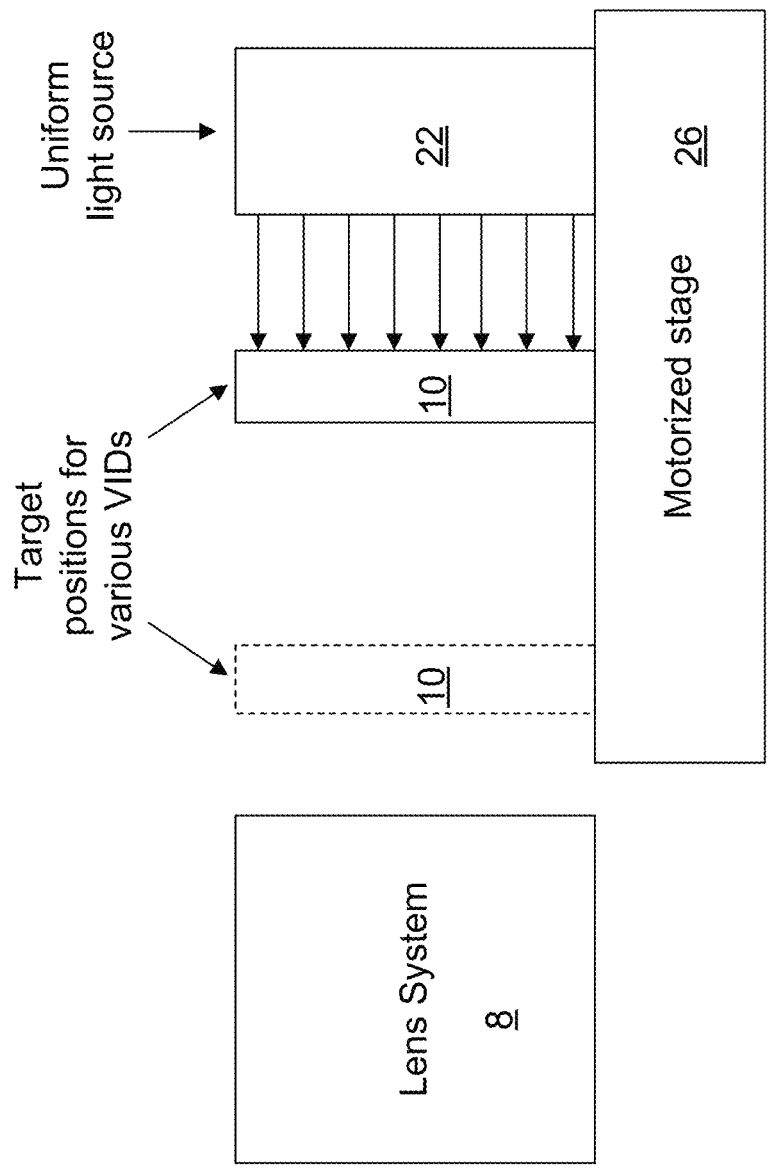
FIG. 9 is a diagram depicting a target that can be installed on a motorized linear stage to enable automatically and continuously changing VIDs.

FIG. 8 is a diagram depicting a target that can be installed on a fixed holder with a series of positions calibrated for different VIDs. FIG. 9 is a diagram depicting a target that can be installed on a motorized linear stage to enable automatically and continuously changing VIDs. Referring to FIGS. 8 and 9, a simplified view of the present optical target system 2 is provided. In the embodiment shown, a uniform light source 22 is configured to be disposed behind a target 10 to illuminate the target 10 such that the cast virtual image becomes spatially uniform and clear. In one embodiment, the optical target system further includes a linear stage for receiving the target. The linear stage is configured to allow adjustment of a location of the target with respect to the lens system 8 along the optical path. In one embodiment, the linear stage is a motorized linear stage. It shall be noted that the target 10 may be held in place along the optical path with a fixed holder 24 as shown in FIG. 8 although a motorized stage 26 shown in FIG. 9 can provide a mechanism for easily altering the target's position along the optical path when a DUT calls for a different projected virtual image of the target 10 that is disposed at a different position along the optical path. With a linear stage, the change in position of the target 10 can be continuously causing a wide variety of VIDs to be accommodated and negative impacts due to the act of physically altering the target, even by removing and replacing the target can be minimized. The target is said to be adjustable in position along the optical path in a continuously-variable manner, i.e., for any VID, there is a corresponding target position which is capable of producing a virtual image disposed at that VID. Although the target can be a physical target having fixed features, the target can be a display, e.g., an electronic display, suitable for displaying certain patterns or any patterns, etc., an electronic display a user so chooses, e.g., a micro organic light-emitting diode (microOLED), a reflective spatial light modulator (SLM) or a transmissive SLM, etc., for the ease of displaying images of the target which a user so chooses. In one embodiment, the target is removably secured such that it can be changed by replacing it with another target, e.g., one which displays another pattern. In one embodiment, the target is configured to be removably received in a target holder or carrier such that targets with different resolutions of line pairs (lp)/degree, can be used. A suitable target holder is one which possesses small mechanical tolerance, e.g., a holder with dowel pins to precisely position the target, for enhanced accuracy of the target while interposed in the optical path. FIG. 10 is a table depicting the size of a target being projected that remains unchanged when the VID changes when the present lens system is an object-space telecentric imaging lens. For targets of the same lp/degree, a target can be installed on a motorized linear stage to enable automatically and continuously changing VIDs. For targets of different lp/deg, another motorized linear stage can be used on the top of the first stage to automatically select an individual target to achieve full automation where different targets with various patterns can be automatically switched into the optical path so that the present optical target system can project each unique target to form its virtual images with different VIDs for a variety of measurements in optical metrology and applications.

Figure 11:
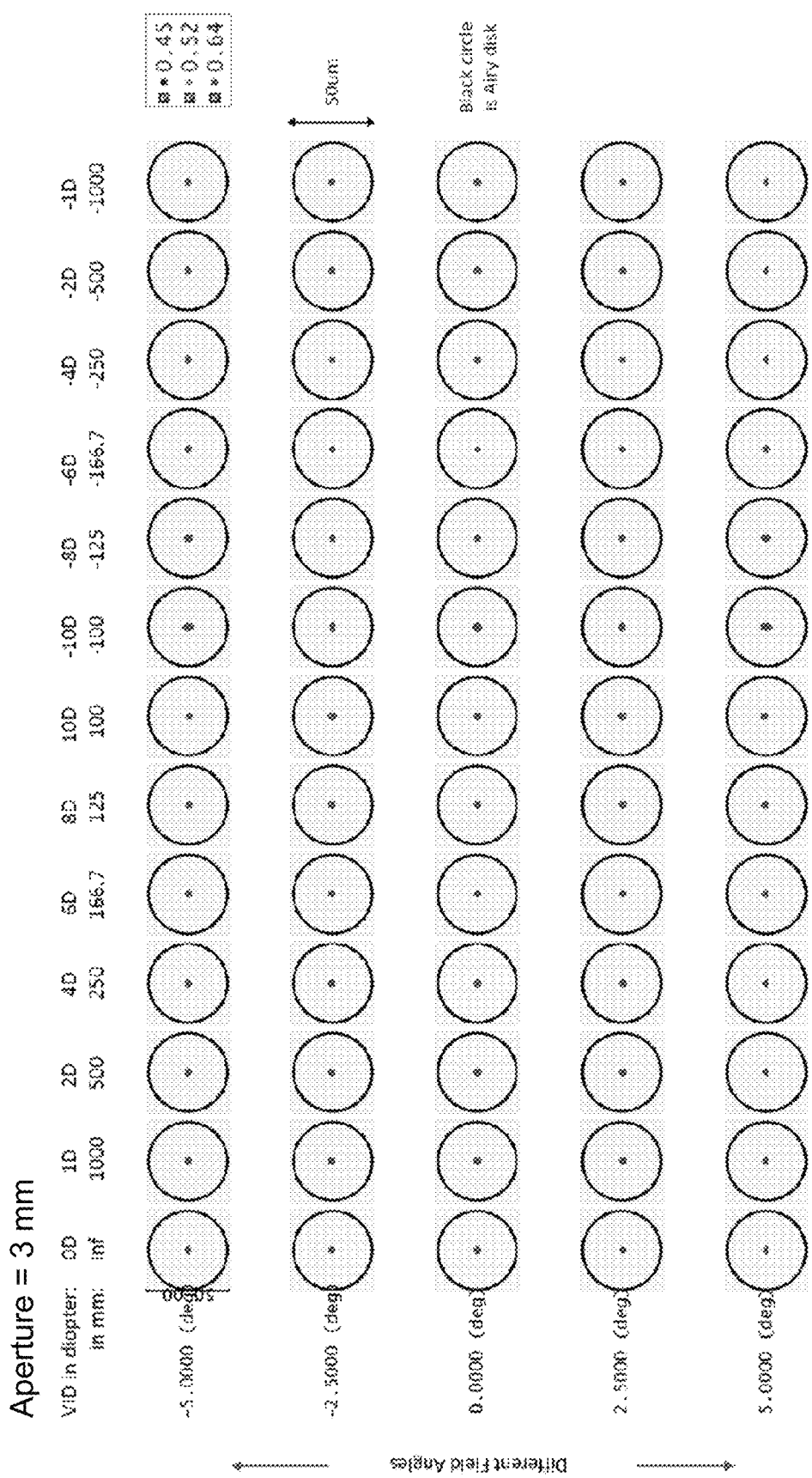
FIG. 11 is a diagram depicting an array of spot diagrams for various field angles and at different VIDs with an exemplary pupil size of 3 mm, showing the lens system having diffraction-limited performance across a full field of view (FOV) with an extremely large VID coverage.

FIG. 11 is a diagram depicting an array of spot diagrams for various field angles and at a pupil size of 3 mm. The dark circle in each diagram is an Airy disk which is the best-focused spot of light that a perfect lens with a circular aperture can make, limited by the diffraction of light. The spot diagrams show the lens system having a diffraction-limited performance across an FOV.

Figure 12:
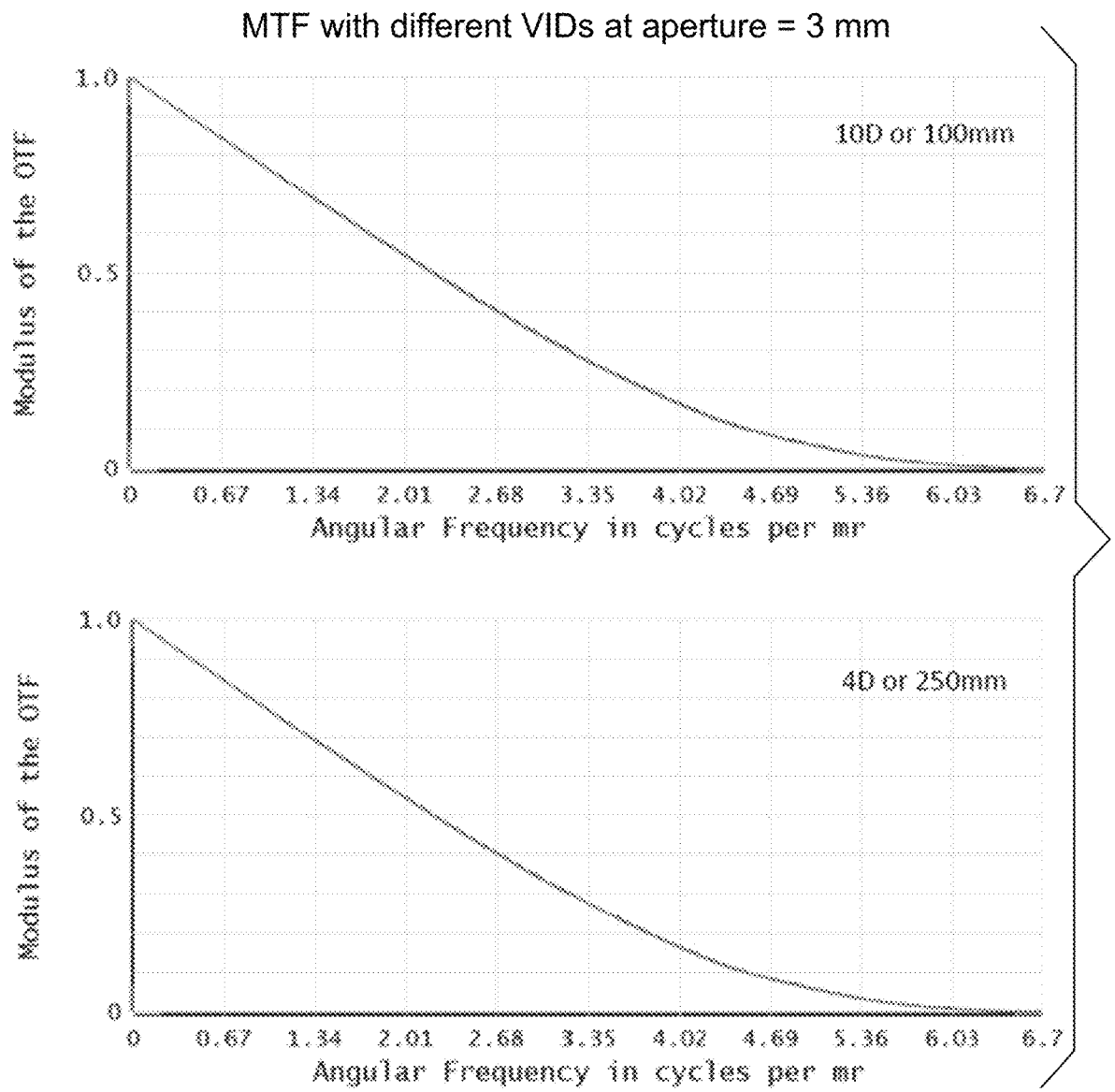
FIG. 12 is a diagram depicting a diffraction-limited modulation transfer function (MTF) for two different VIDs at a pupil size of 3 mm.
Figure 13:
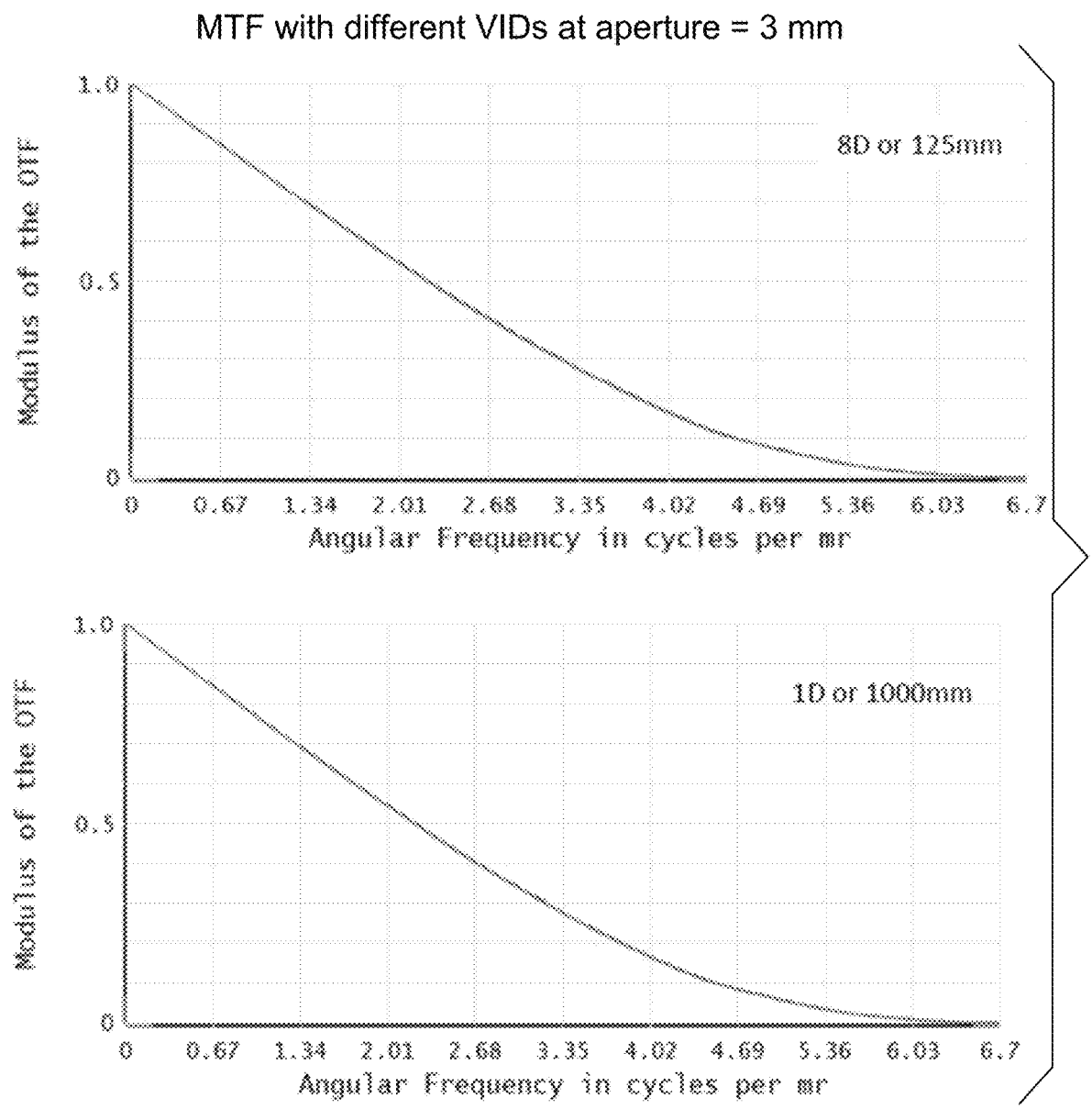
FIG. 13 is a diagram depicting a diffraction-limited MTF for two different VIDs at a pupil size of 3 mm.
Figure 14:
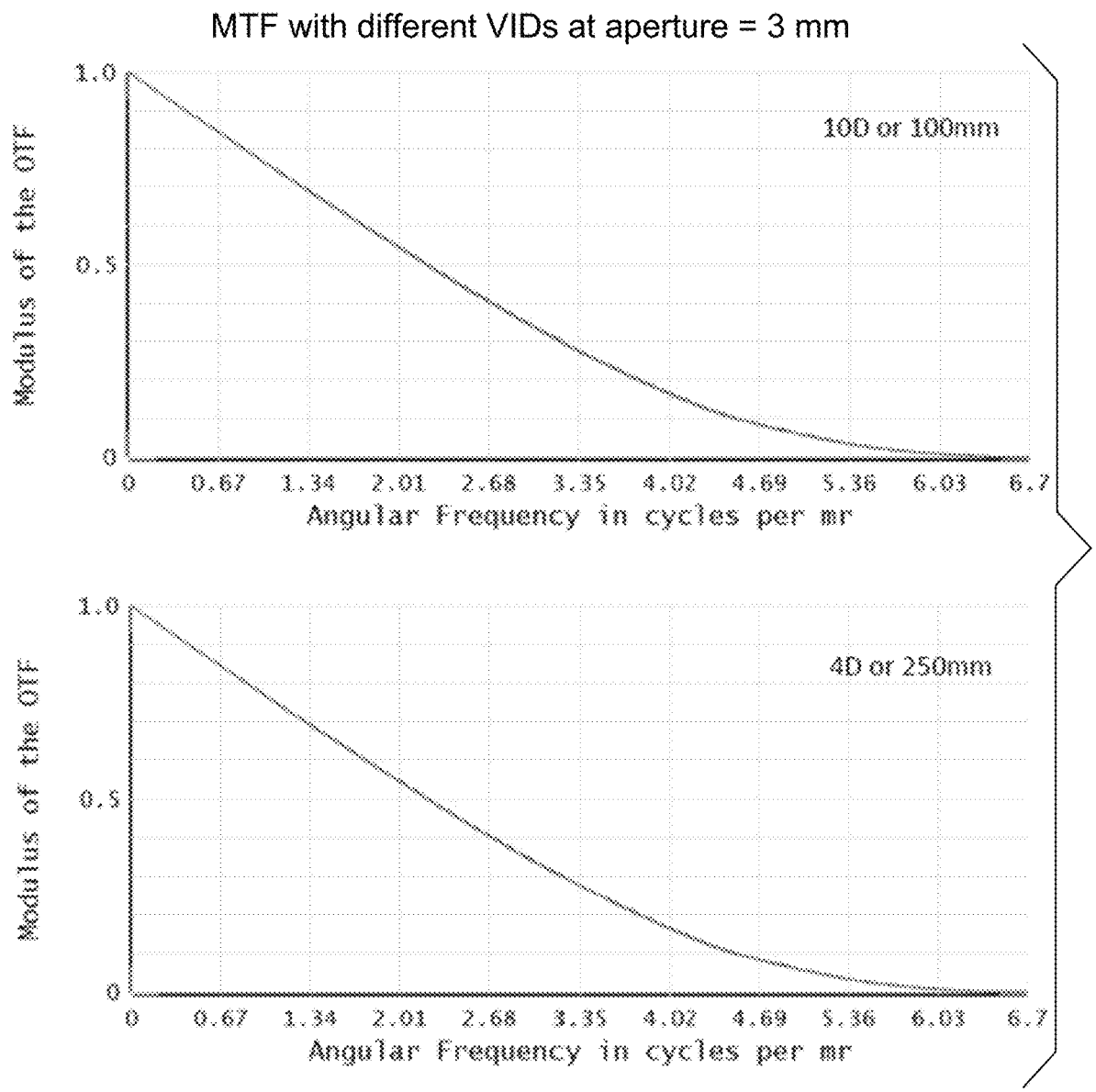
FIG. 14 is a diagram depicting a diffraction-limited MTF for two different VIDs at a pupil size of 3 mm.
Figure 15:
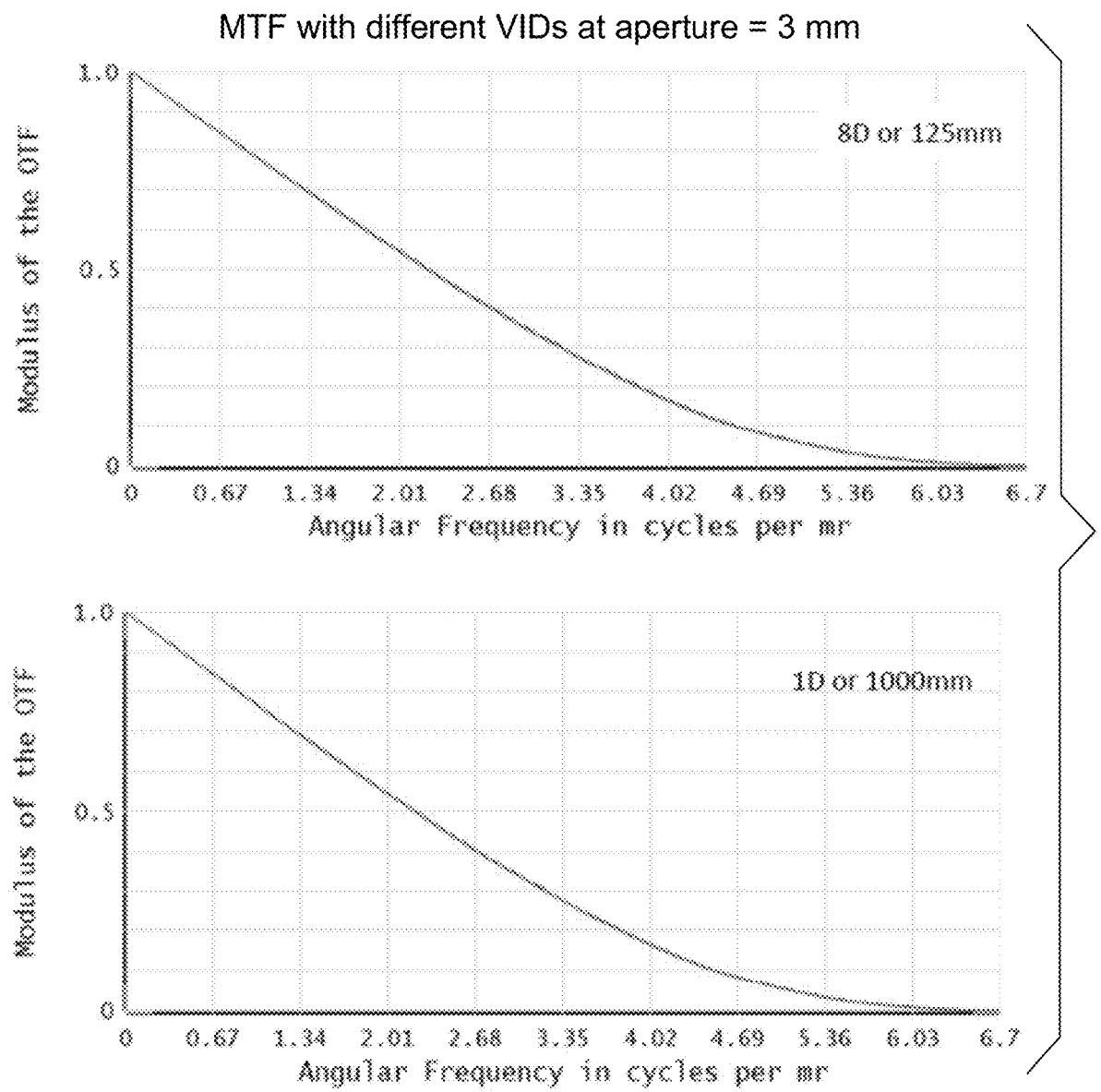
FIG. 15 is a diagram depicting a diffraction-limited MTF for two different VIDs at a pupil size of 3 mm.
Figure 16:
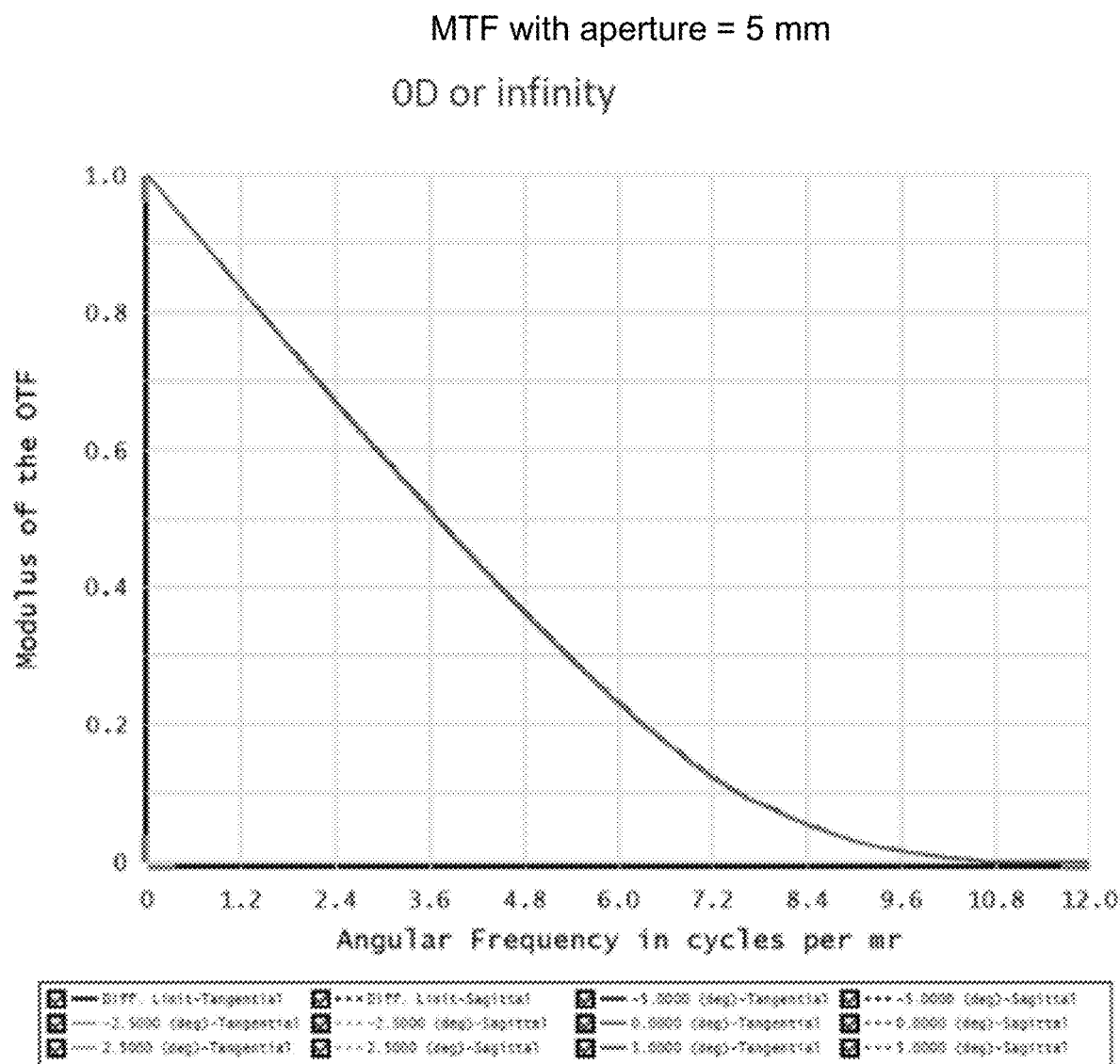
FIG. 16 is a diagram depicting a diffraction-limited MTF for a pupil size of 5 mm at VID of 0D.
Figure 17:
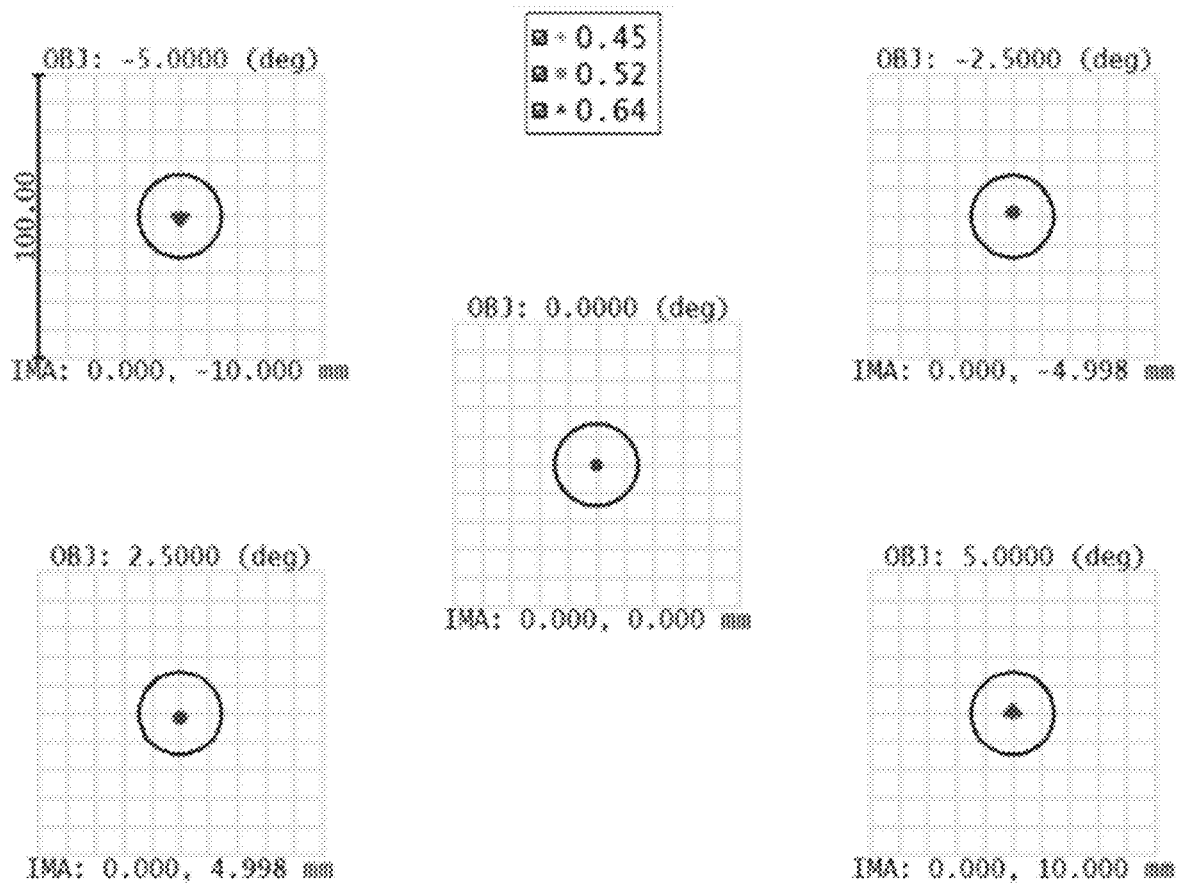
FIG. 17 depicts spot diagrams corresponding to the diffraction-limited MTF shown in FIG. 16.
Figure 18:
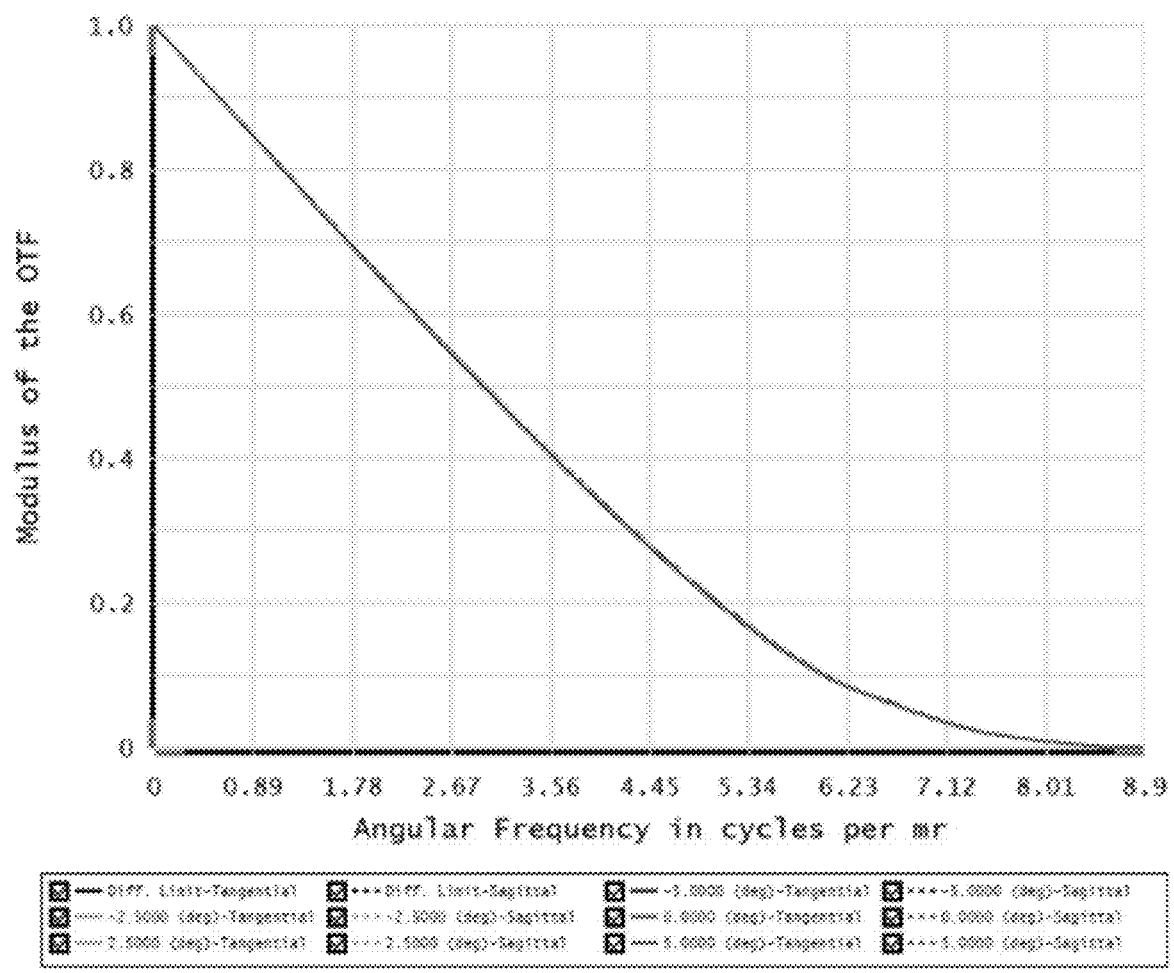
FIG. 18 is a diagram depicting a diffraction-limited MTF for a pupil size of 4 mm at VID of 0D.
Figure 19:
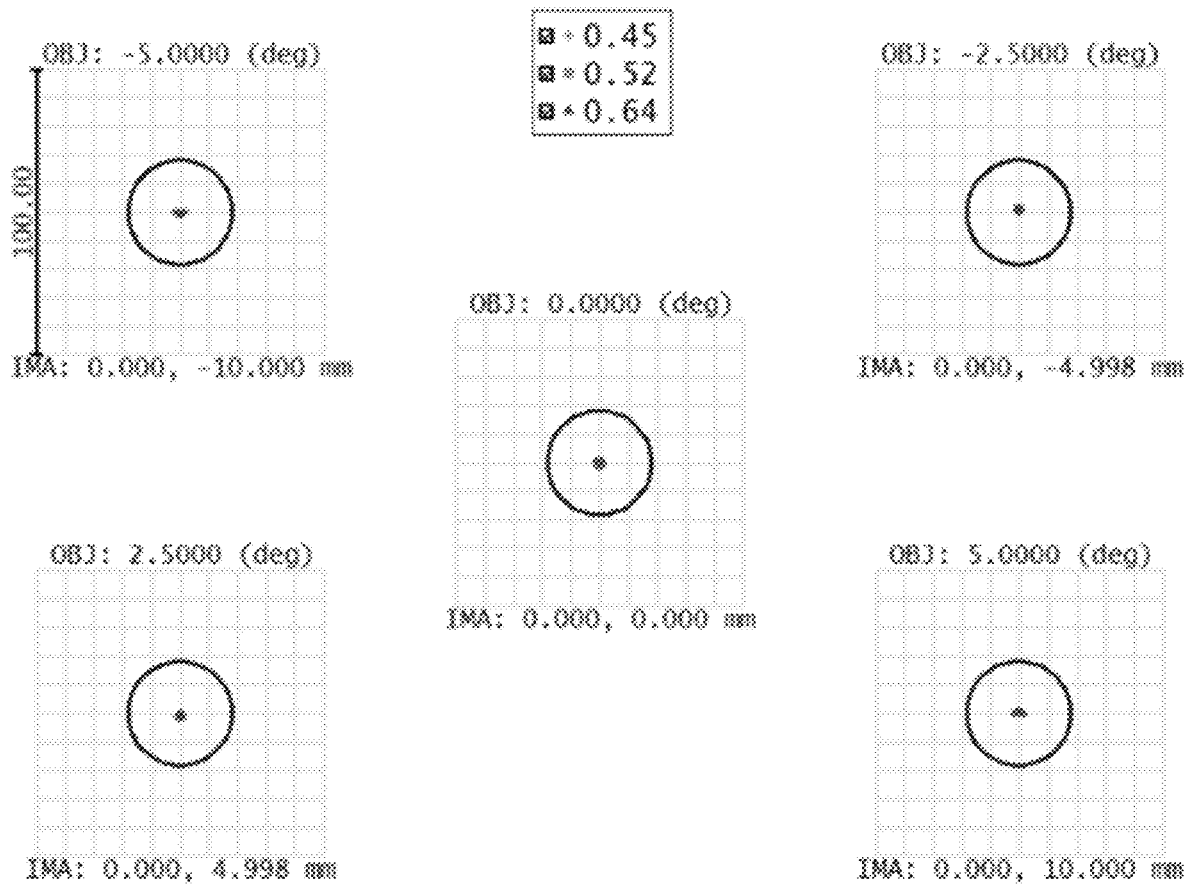
FIG. 19 depicts spot diagrams corresponding to the diffraction-limited MTF shown in FIG. 18.
Figure 20:
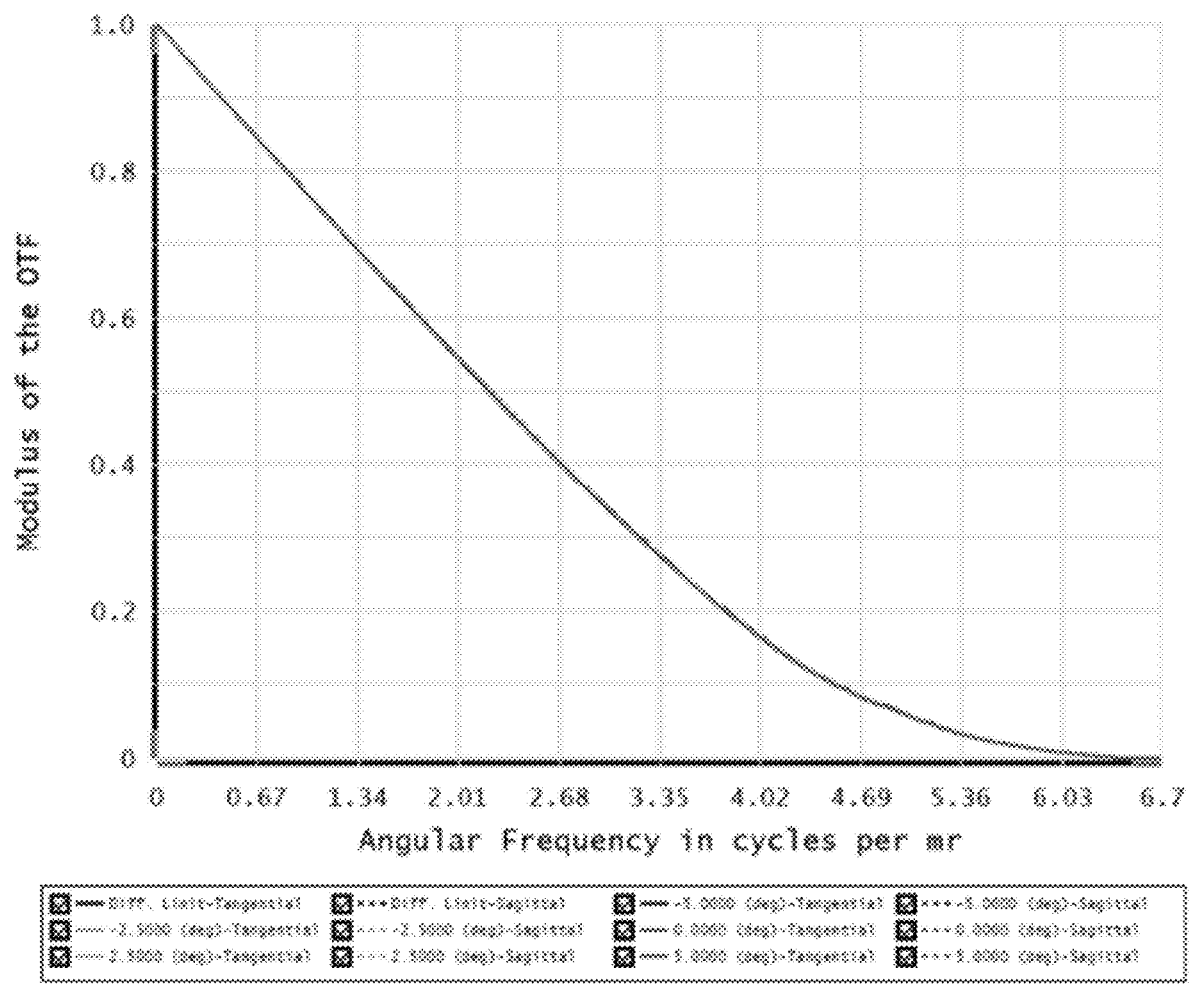
FIG. 20 is a diagram depicting a diffraction-limited MTF for a pupil size of 3 mm at VID of 0D.
Figure 21:
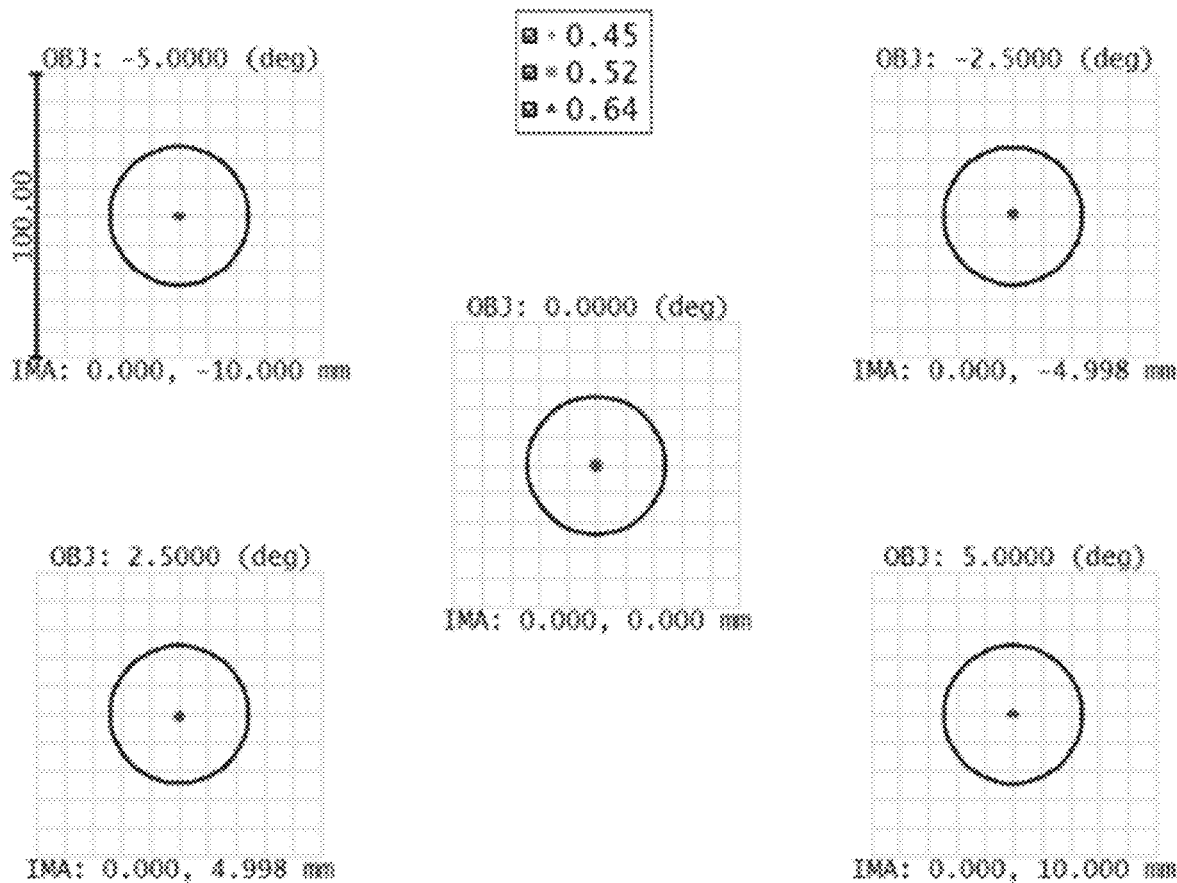
FIG. 21 depicts spot diagrams corresponding to the diffraction-limited MTF shown in FIG. 20.

FIG. 12 is a diagram depicting a modulation transfer function (MTF) for two different VIDs at a pupil size of 3 mm. FIG. 13 is a diagram depicting an MTF for two different VIDs at a pupil size of 3 mm. FIG. 14 is a diagram depicting an MTF for two different VIDs at a pupil size of 3 mm. FIG. 15 is a diagram depicting an MTF for two different VIDs at a pupil size of 3 mm. FIG. 16 is a diagram depicting an MTF for a pupil size of 5 mm at VID of 0D. It shall be noted that the MTF curves in FIGS. 12-16 are overlapped together at different field angles as well as superposed with the diffraction-limited MTF curve, indicating the lens system having excellent optical performance of diffraction limit. FIG. 17 depicts spot diagrams corresponding to the MTF shown in FIG. 16. FIG. 18 is a diagram depicting an MTF for a pupil size of 4 mm at VID of 0D. FIG. 19 depicts spot diagrams corresponding to the MTF shown in FIG. 18. FIG. 20 is a diagram is depicting an MTF for a pupil size of 3 mm at VID of 0D. FIG. 21 depicts spot diagrams corresponding to the MTF shown in FIG. 20. FIG.

Figure 22:
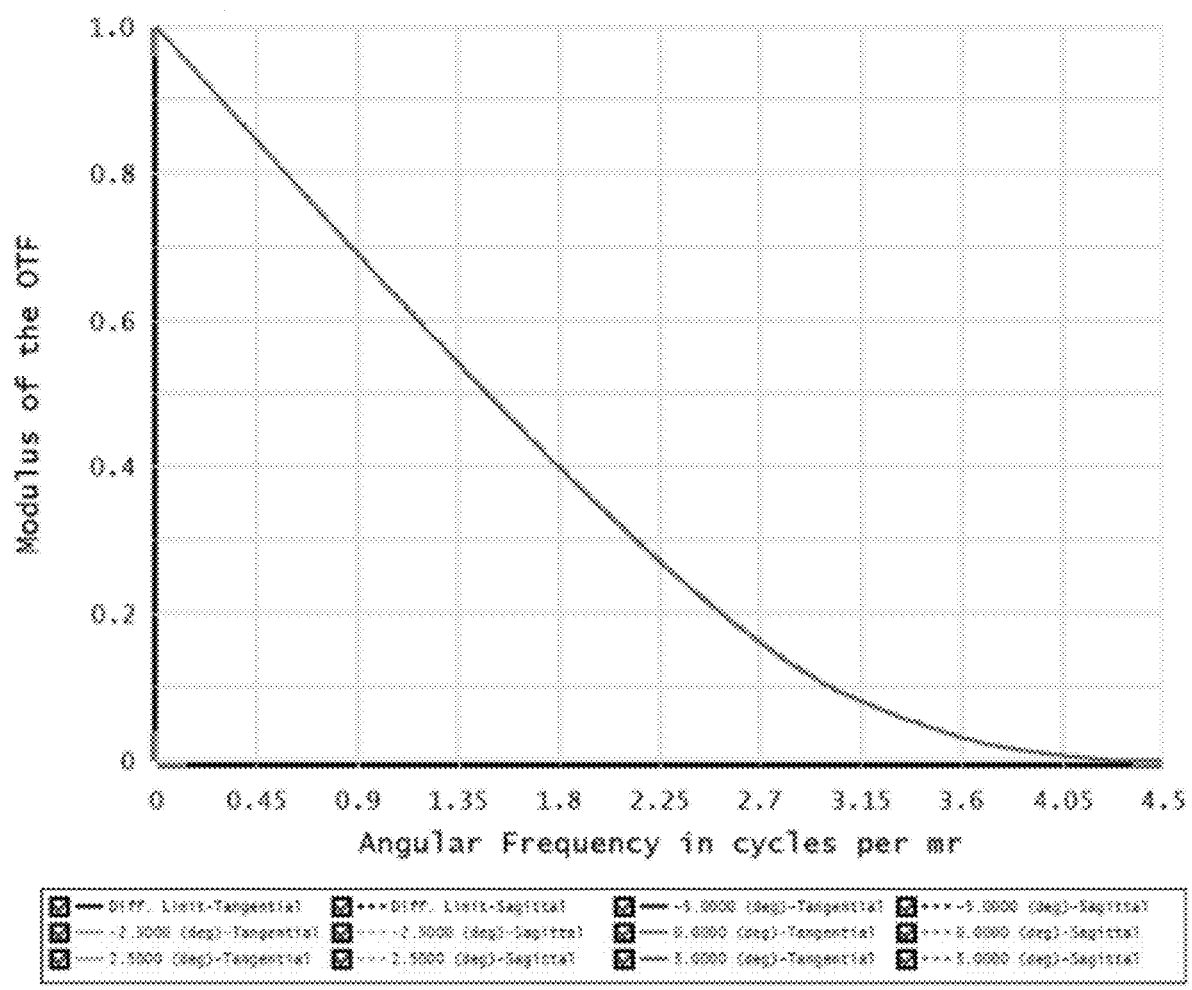
FIG. 22 is a diagram depicting a diffraction-limited MTF for a pupil size of 2 mm at VID of 0D.
Figure 23:
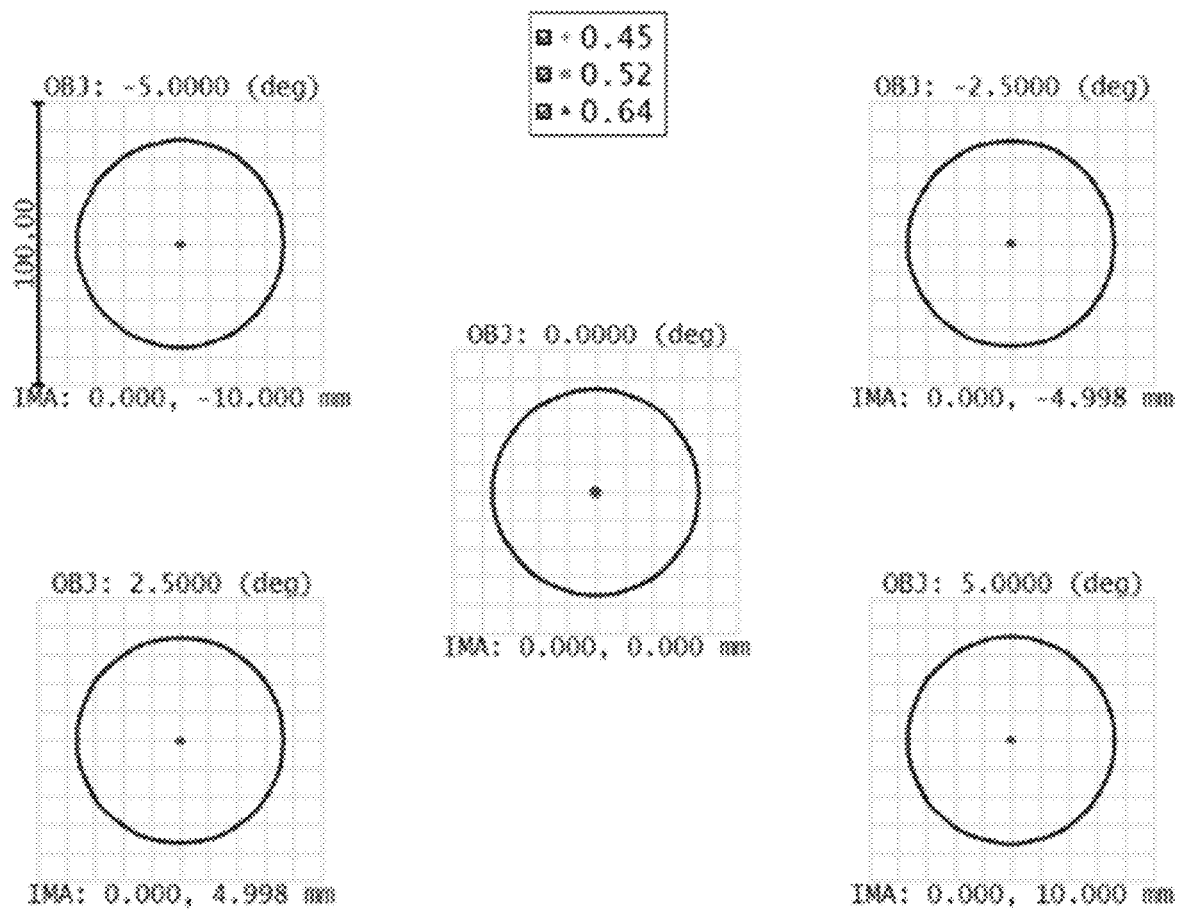
FIG. 23 depicts spot diagrams corresponding to the diffraction-limited MTF shown in FIG. 22.
Figure 24:
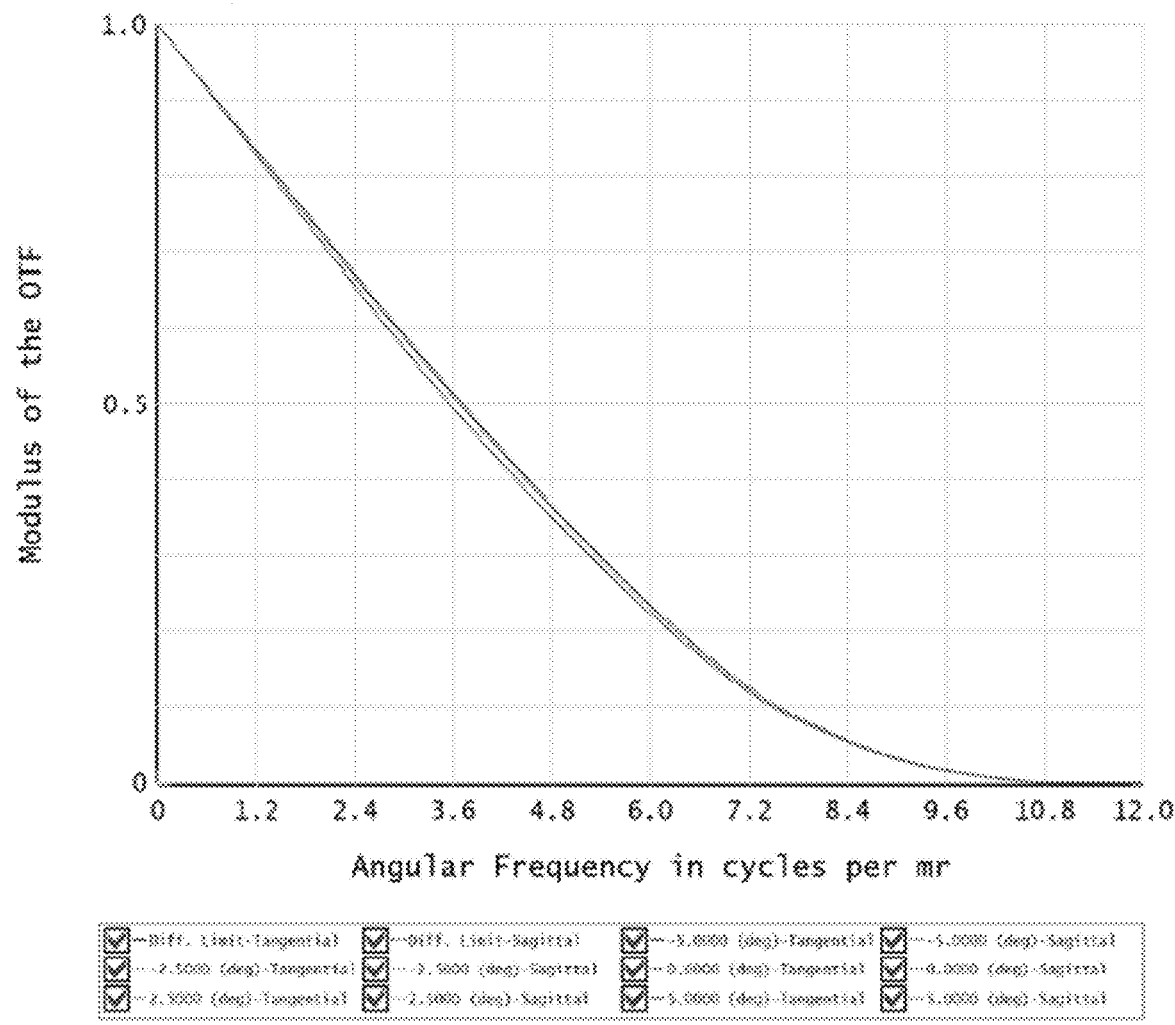
FIG. 24 is a diagram depicting a diffraction-limited MTF for a pupil size of 5 mm at VID of −10D.
Figure 25:
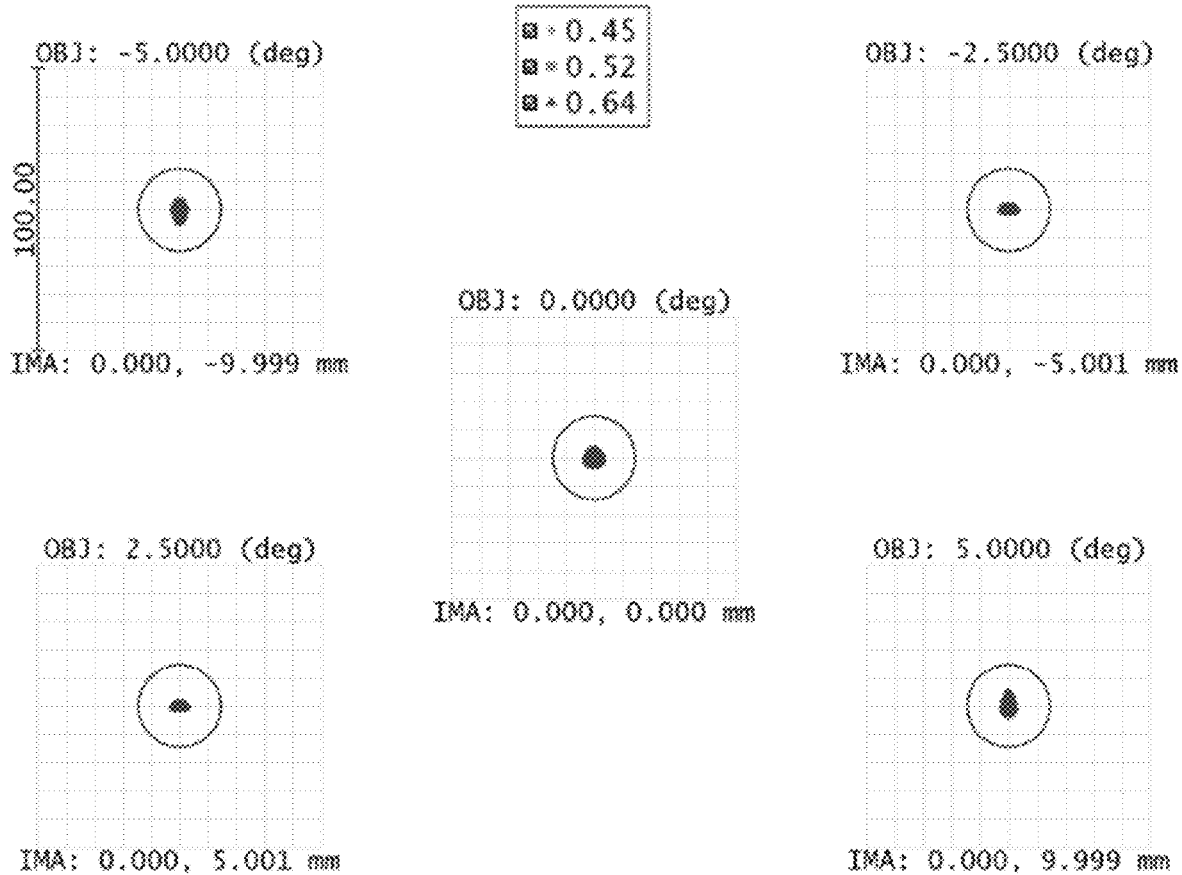
FIG. 25 depicts spot diagrams corresponding to the diffraction-limited MTF shown in FIG. 24.
Figure 26:
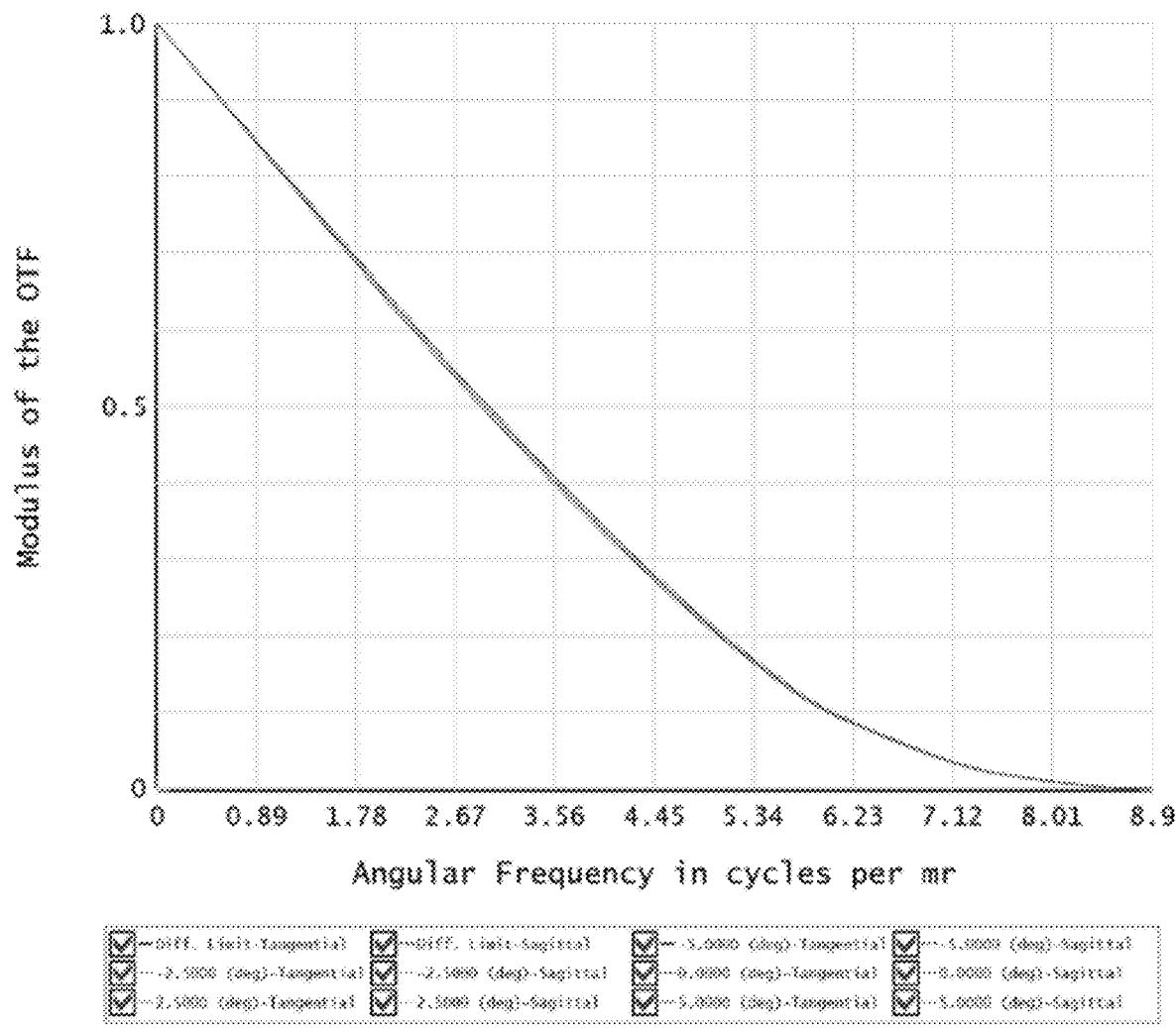
FIG. 26 is a diagram depicting a diffraction-limited MTF for a pupil size of 4 mm at VID of −10D.
Figure 28:
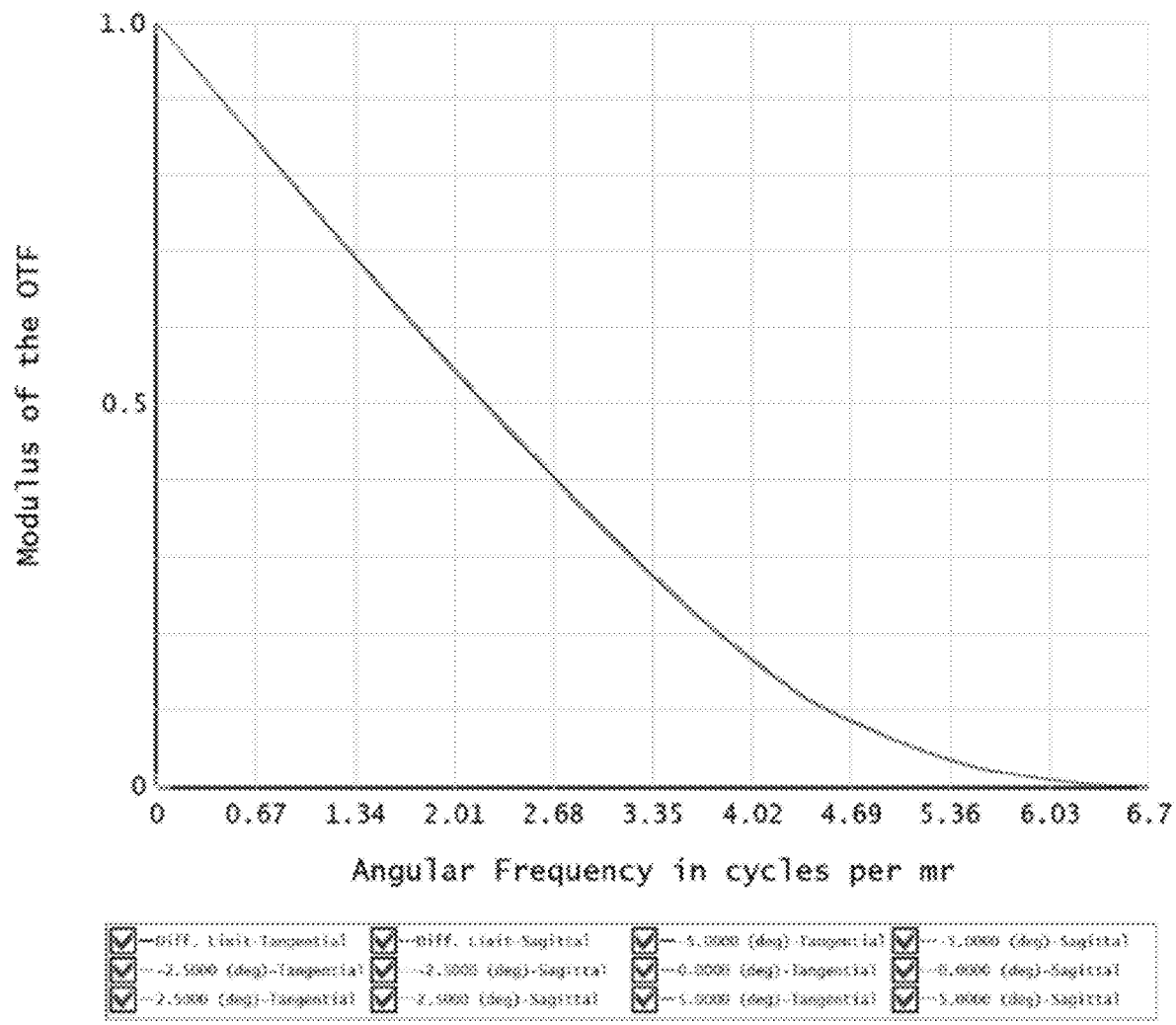
FIG. 28 is a diagram depicting a diffraction-limited MTF for a pupil size of 3 mm at VID of −10D.
Figure 29:
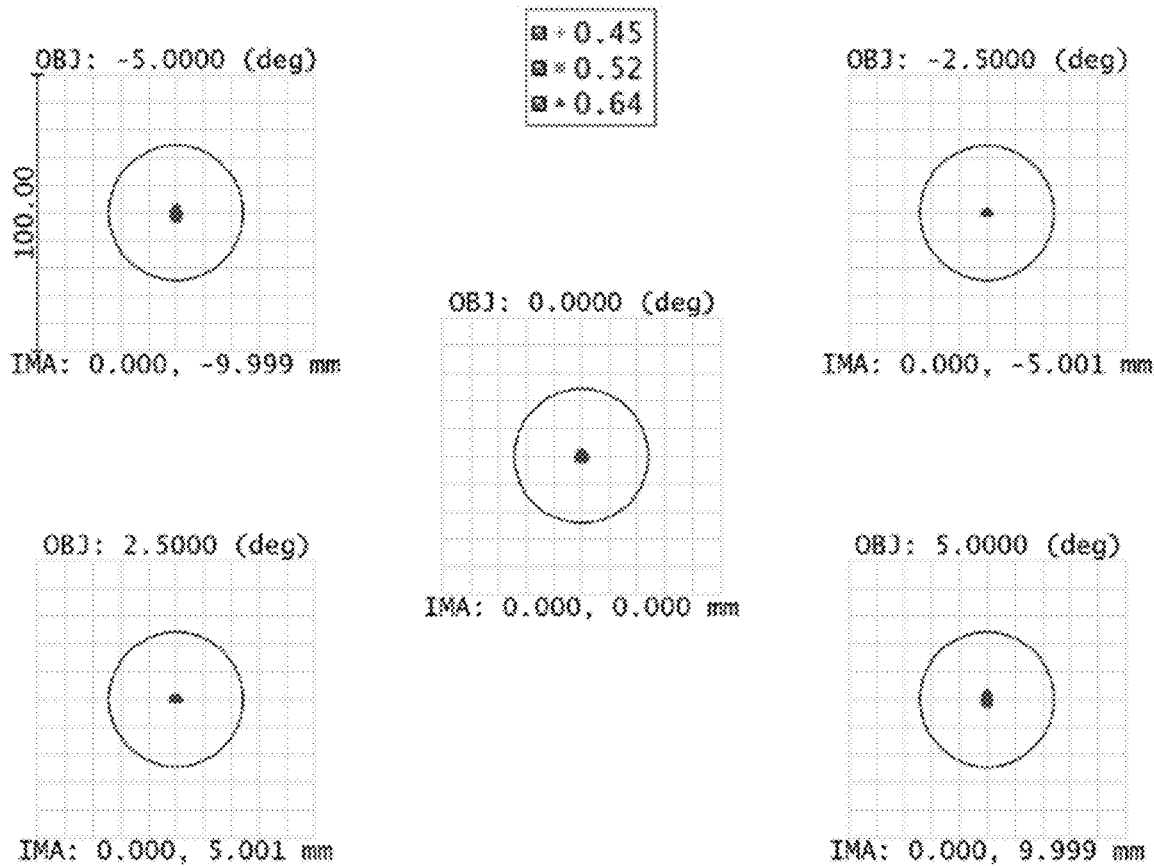
FIG. 29 depicts spot diagrams corresponding to the diffraction-limited MTF shown in FIG. 28.
Figure 30:
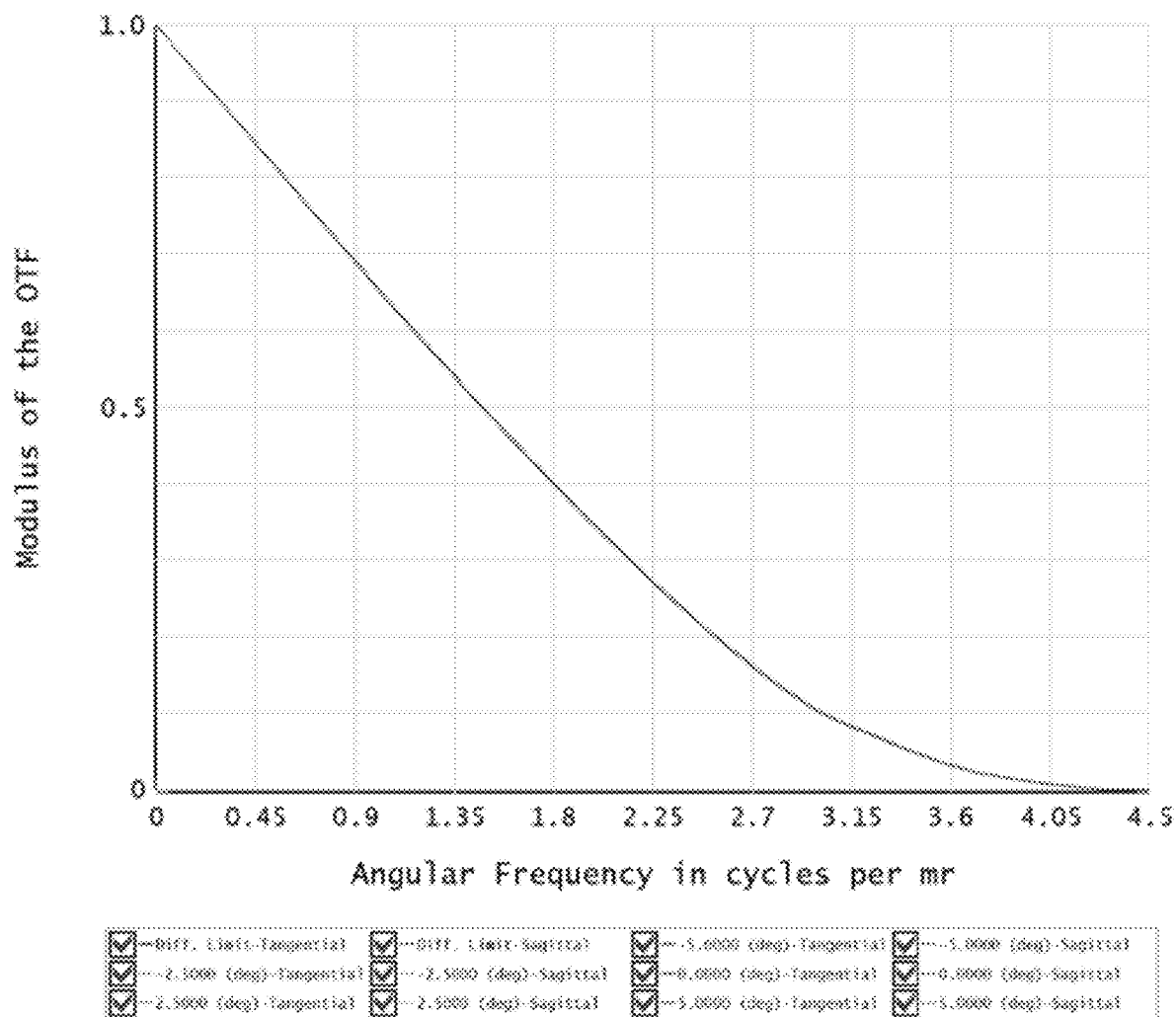
FIG. 30 is a diagram depicting a diffraction-limited MTF for a pupil size of 2 mm at VID of −10D.

22 is a diagram depicting an MTF for a pupil size of 2 mm at VID of 0D. FIG. 23 depicts spot diagrams corresponding to the MTF shown in FIG. 22. FIG. 24 is a diagram depicting an MTF for a pupil size of 5 mm at VID of −10D. FIG. 25 depicts spot diagrams corresponding to the MTF shown in FIG. 24. FIG. 26 is a diagram depicting an MTF for a pupil size of 4 mm at VID of −10D. FIG. 27 depicts spot diagrams corresponding to the MTF shown in FIG. 26. FIG. 28 is a diagram depicting an MTF for a pupil size of 3 mm at VID of −10D. FIG. 29 depicts spot diagrams corresponding to the MTF shown in FIG. 28. FIG. 30 is a diagram depicting an MTF for a pupil size of 2 mm at VID of −10D. FIG. 31 depicts spot diagrams corresponding to the MTF shown in FIG. 30. Based on FIGS. 11-31, the present lens system can be considered well-suited for the present optical target system and qualified for various measurements, alignments and calibrations in optical metrology. As such, a user does not need to be concerned with the present optical target system possibly inducing measurement errors.

Figure 32:
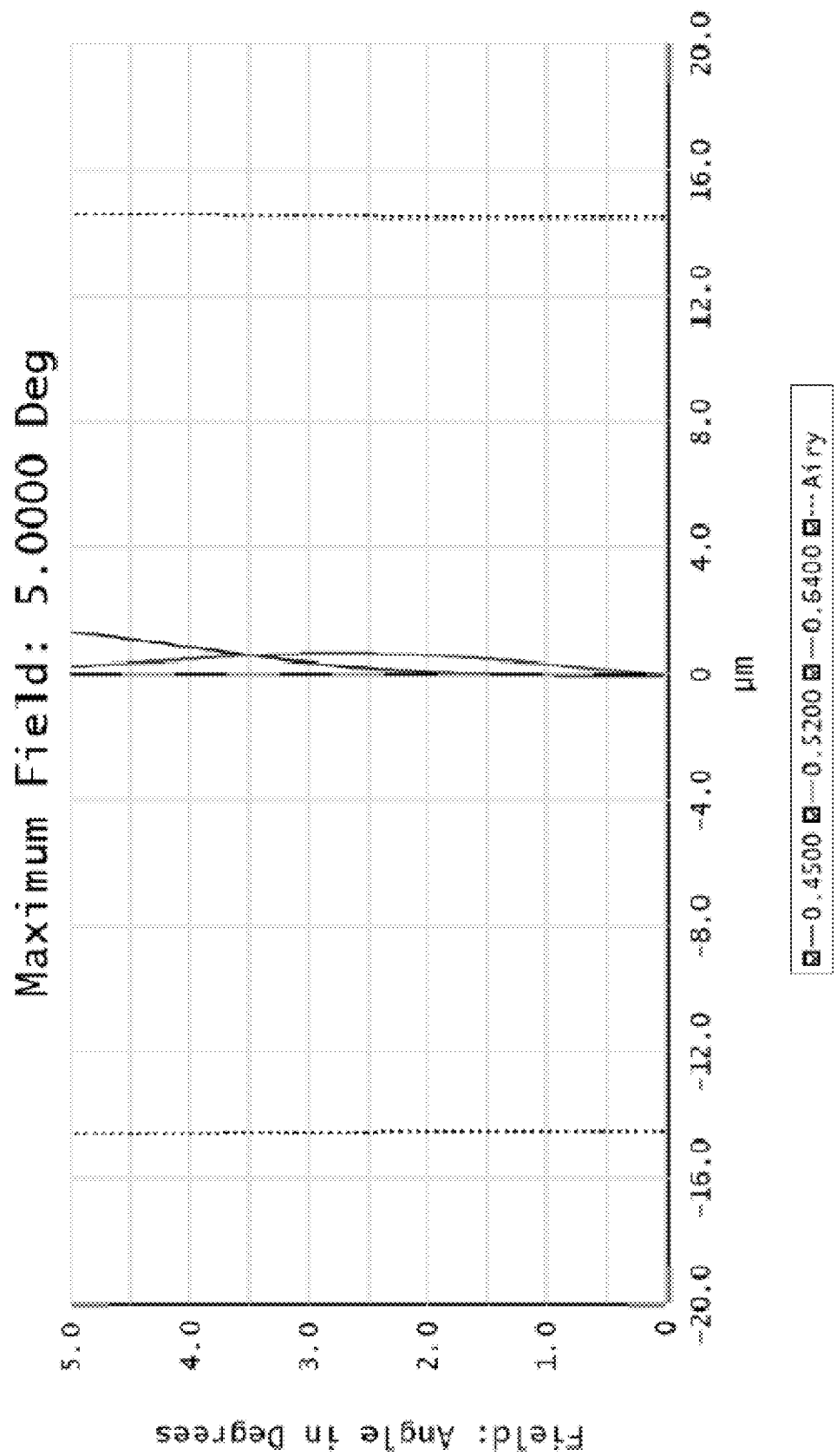
FIG. 32 is a diagram depicting the lateral color of the present lens system for a pupil size of 5 mm.
Figure 33:
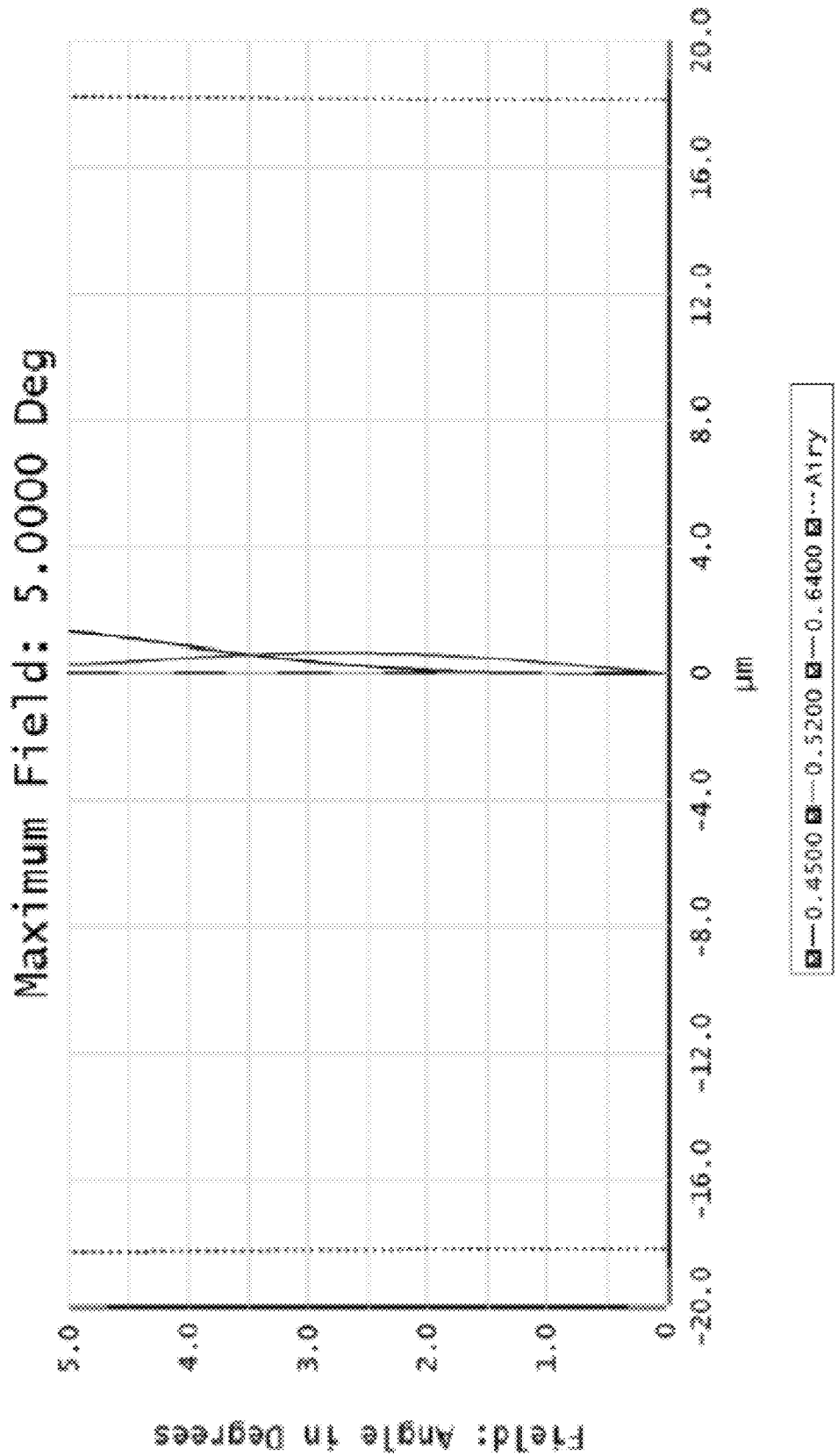
FIG. 33 is a diagram depicting the lateral color of the present lens system for a pupil size of 4 mm.
Figure 34:
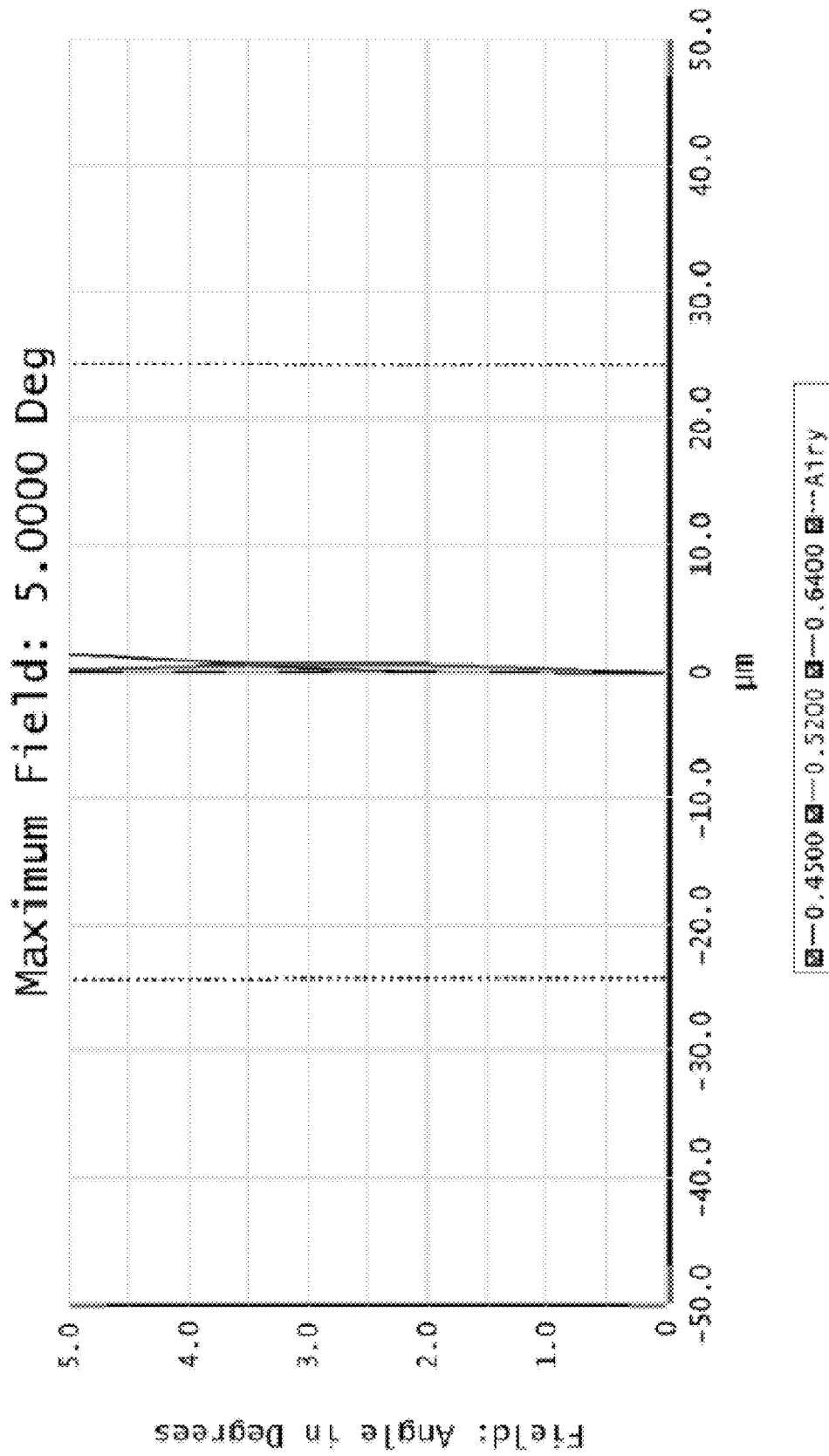
FIG. 34 is a diagram depicting the lateral color of the present lens system for a pupil size of 3 mm.
Figure 35:
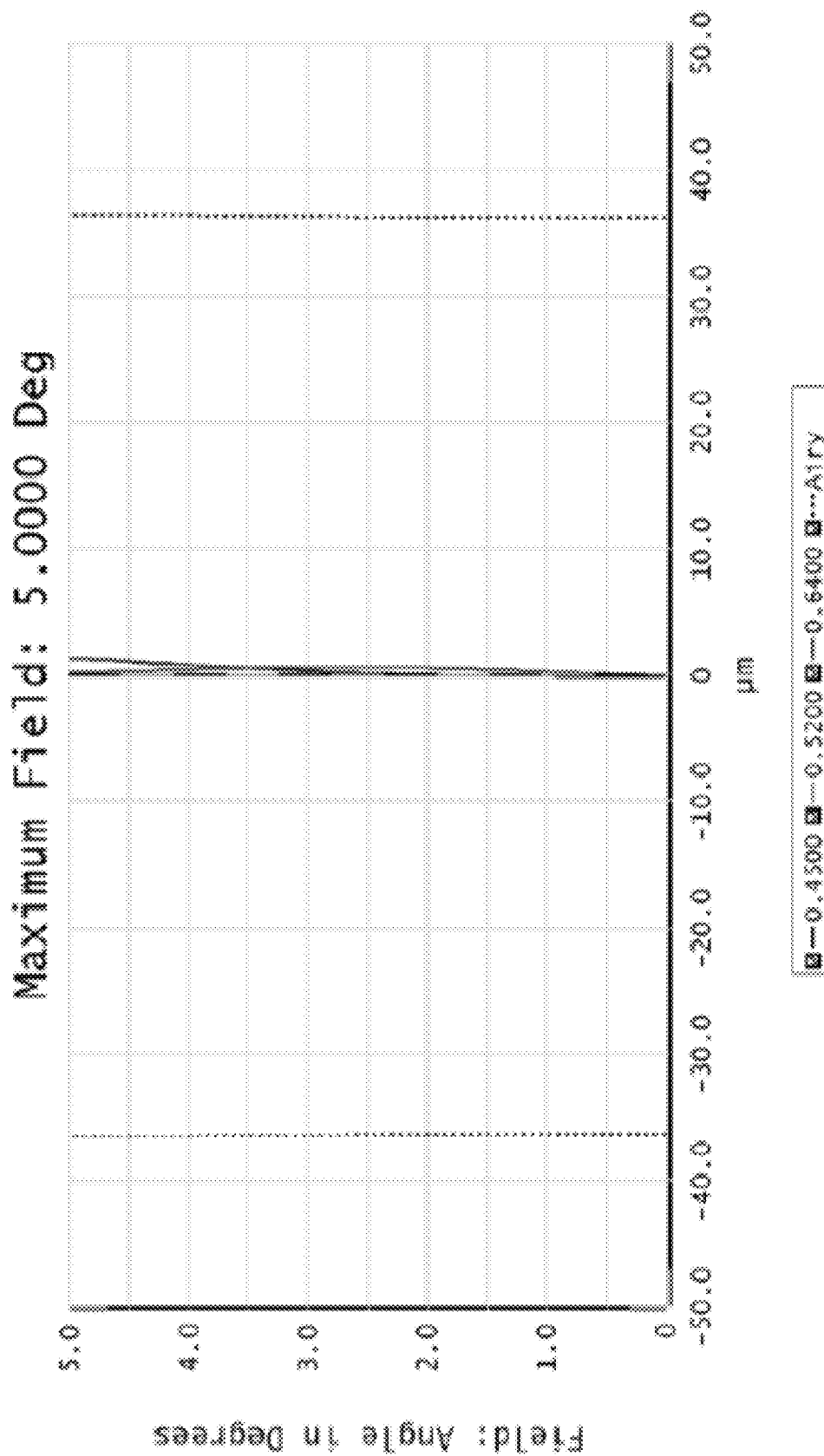
FIG. 35 is a diagram depicting the lateral color of the present lens system for a pupil size of 2 mm.

FIG. 32 is a diagram depicting the lateral color of the present lens system for a pupil size of 5 mm. FIG. 33 is a diagram depicting the lateral color of the present lens system for a pupil size of 4 mm. FIG. 34 is a diagram depicting the lateral color of the present lens system for a pupil size of 3 mm. FIG. 35 is a diagram depicting the lateral color of the present lens system for a pupil size of 2 mm. It shall be noted from FIGS. 32-35 that the lateral color is well controlled within the diffraction limits across all VIDs and aperture sizes. This is critical as individual colors are required for the DUT's color simulation, metrological measurements as well as color calibration of the DUT.

Figure 36:
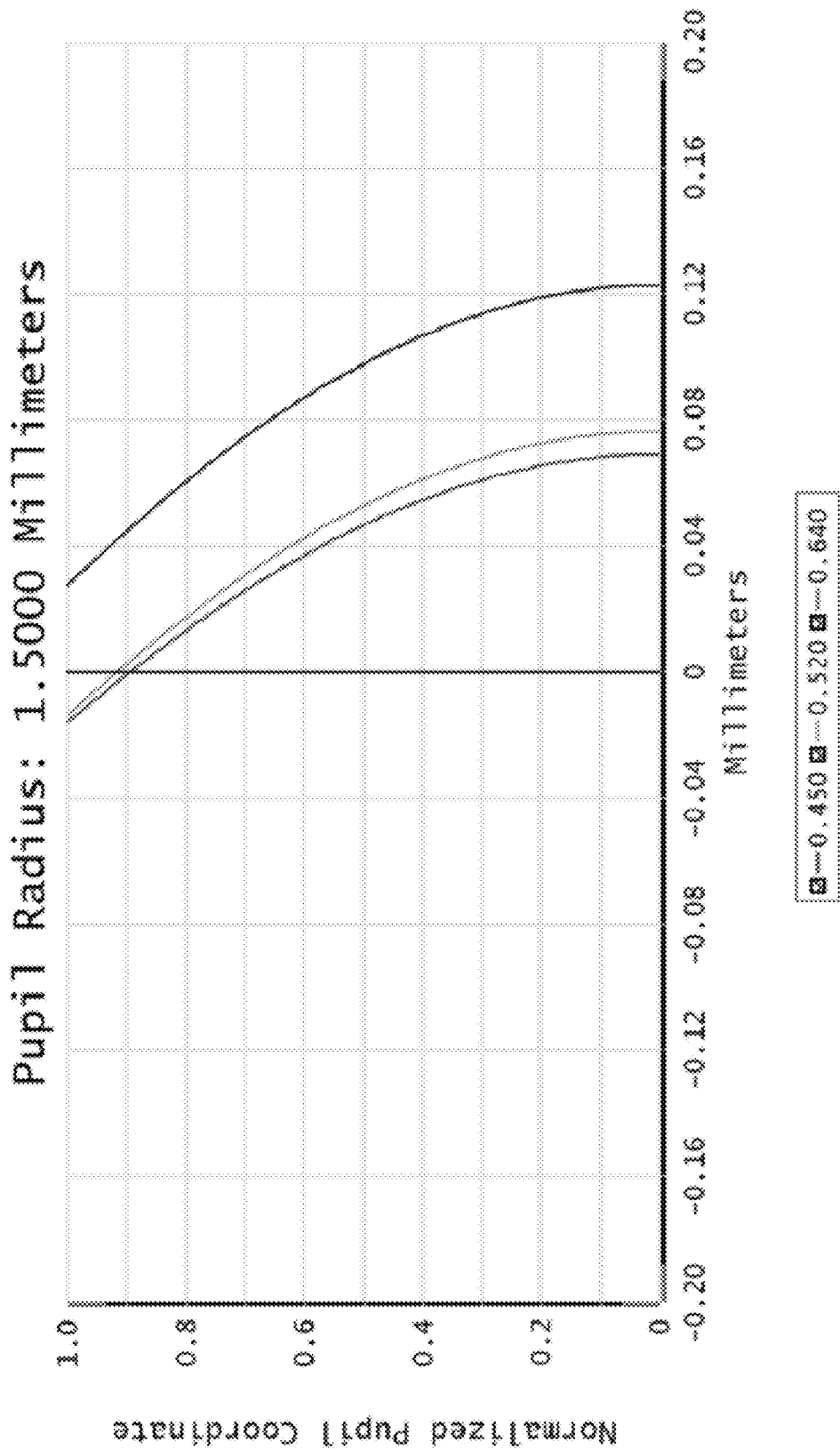
FIG. 36 is a diagram depicting the longitudinal aberration of the present lens system.

FIG. 36 is a diagram depicting the longitudinal aberration of the present lens system. The longitudinal aberration is small compared to the long depth of focus, e.g., about 200 μm. Further, as such measurements are normally conducted with single RGB colors in XR metrology, the longitudinal aberration is not an issue.

Figure 37:
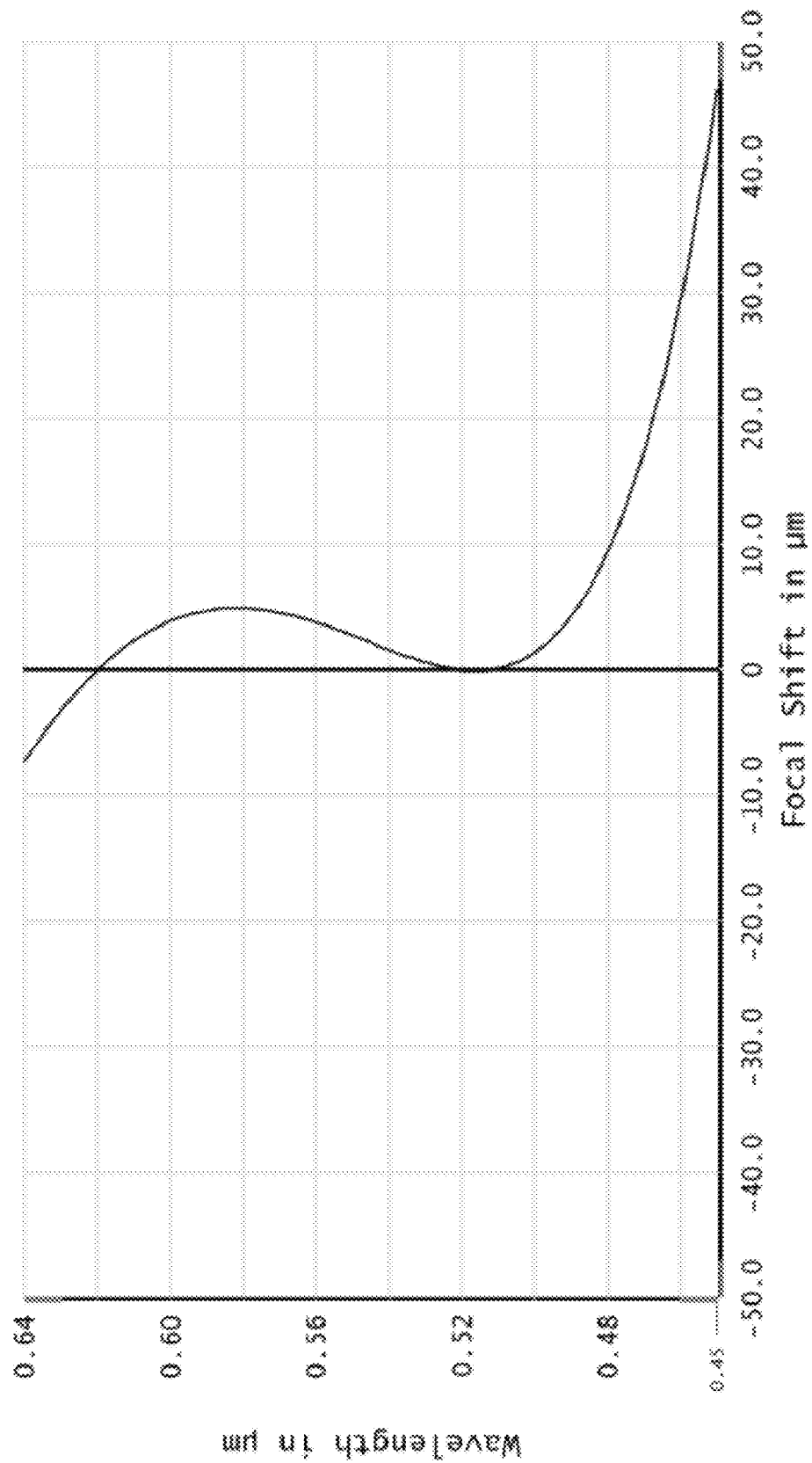
FIG. 37 is a diagram depicting the chromatic focal shift of the present lens system.

FIG. 37 is a diagram depicting the chromatic focal shift of the present lens system. Considering the long depth of focus of present lens system, the chromatic focal shift is not an issue.

Figure 38:
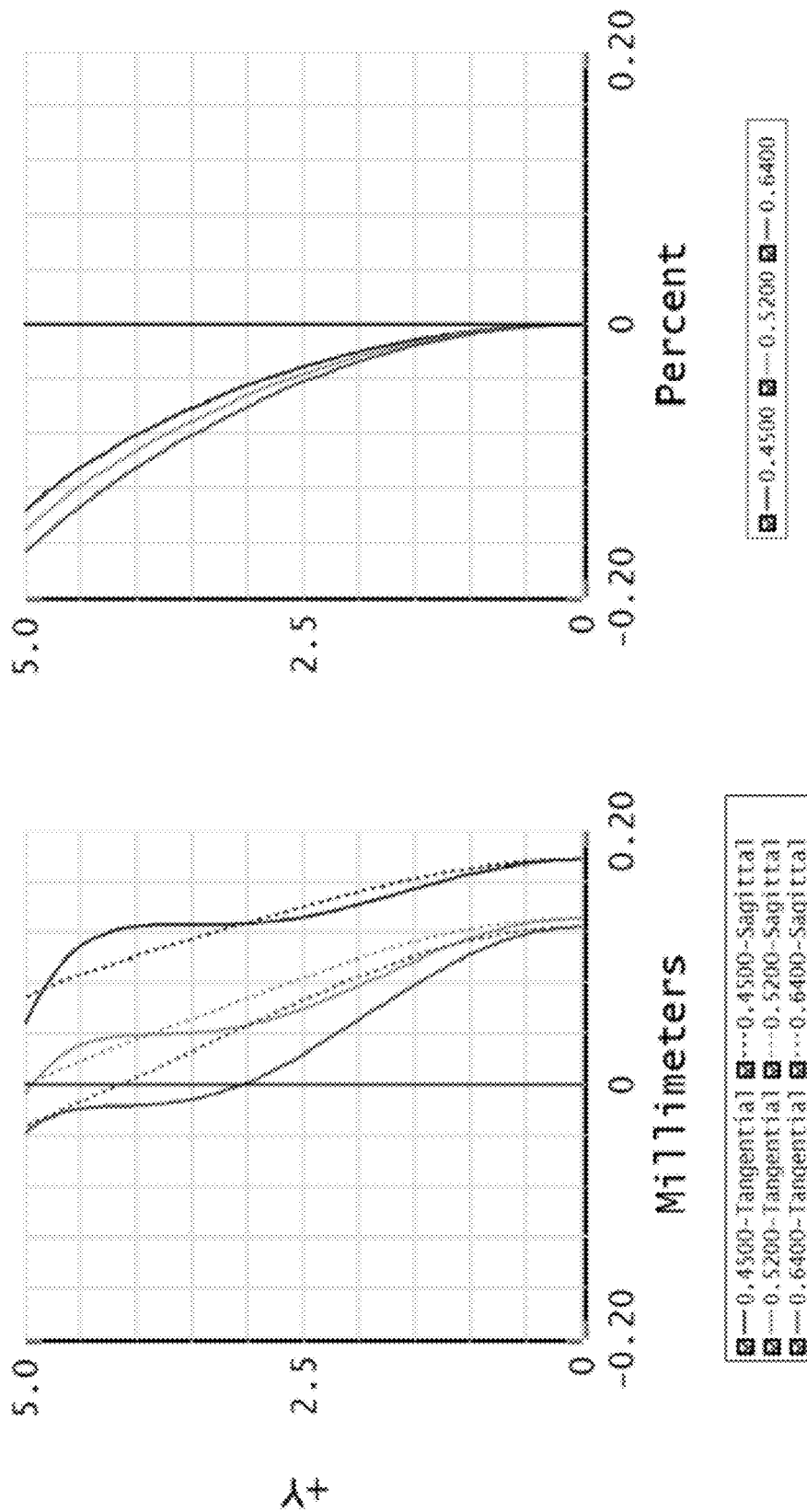
FIG. 38 are diagrams depicting the field curvature and distortion of the present lens system.

FIG. 38 are diagrams depicting the field curvature and distortion of the present lens system. Considering the long depth of focus of the present lens system, the field curvature is not an issue and the distortion is negligible.

Figure 39:
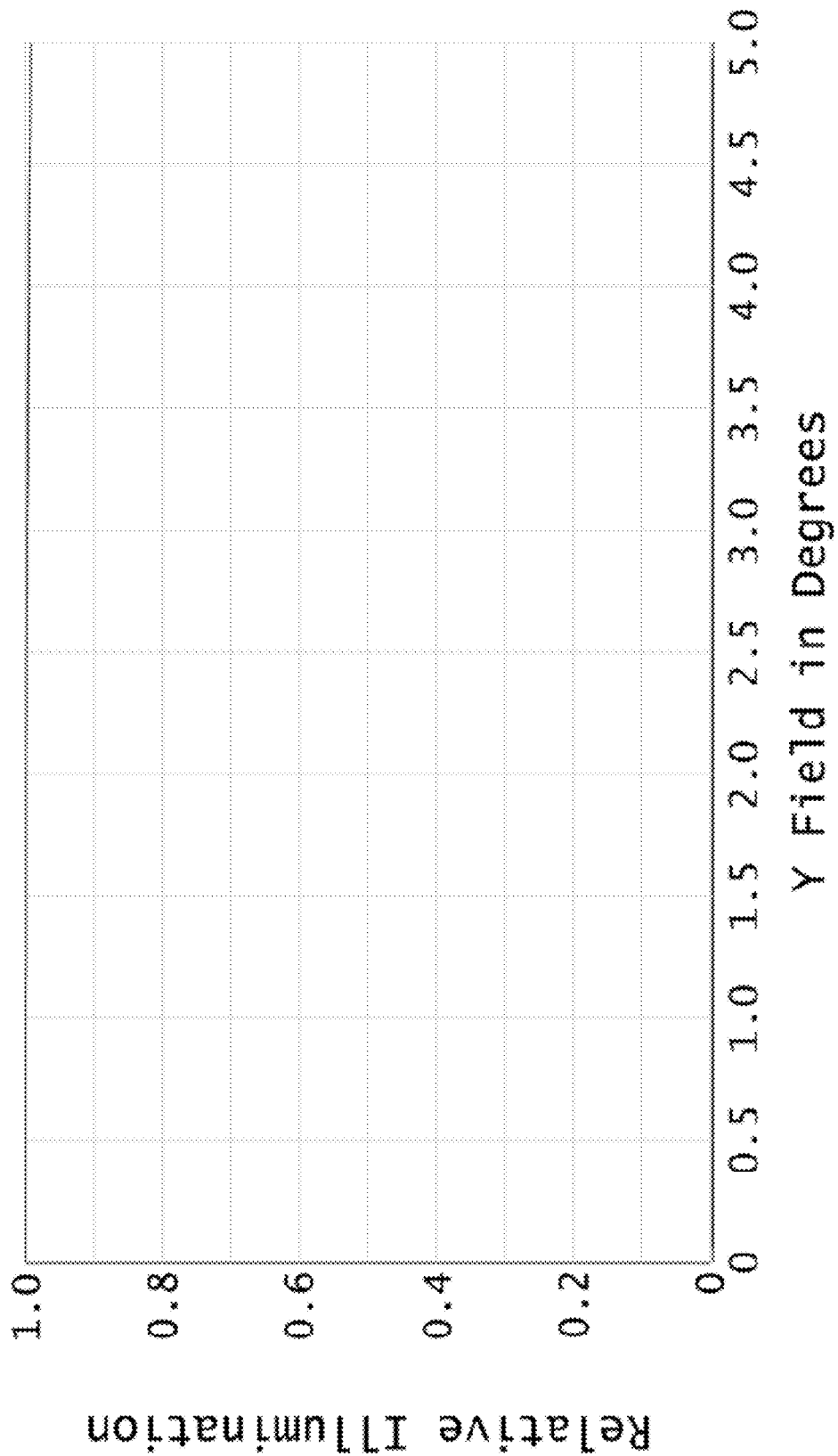
FIG. 39 is a diagram depicting the relative illumination of the present lens system.

FIG. 39 is a diagram depicting the relative illumination of the present lens system. It shall be noted that the lens system allows relative illumination of 99% uniformity across 10-degree FOV for all VIDs from ±10D to infinity which is critical for measurements and calibrations of chromaticity and luminance for a DUT, e.g., a camera or another optical system when using the present optical target system.

Figure 40:
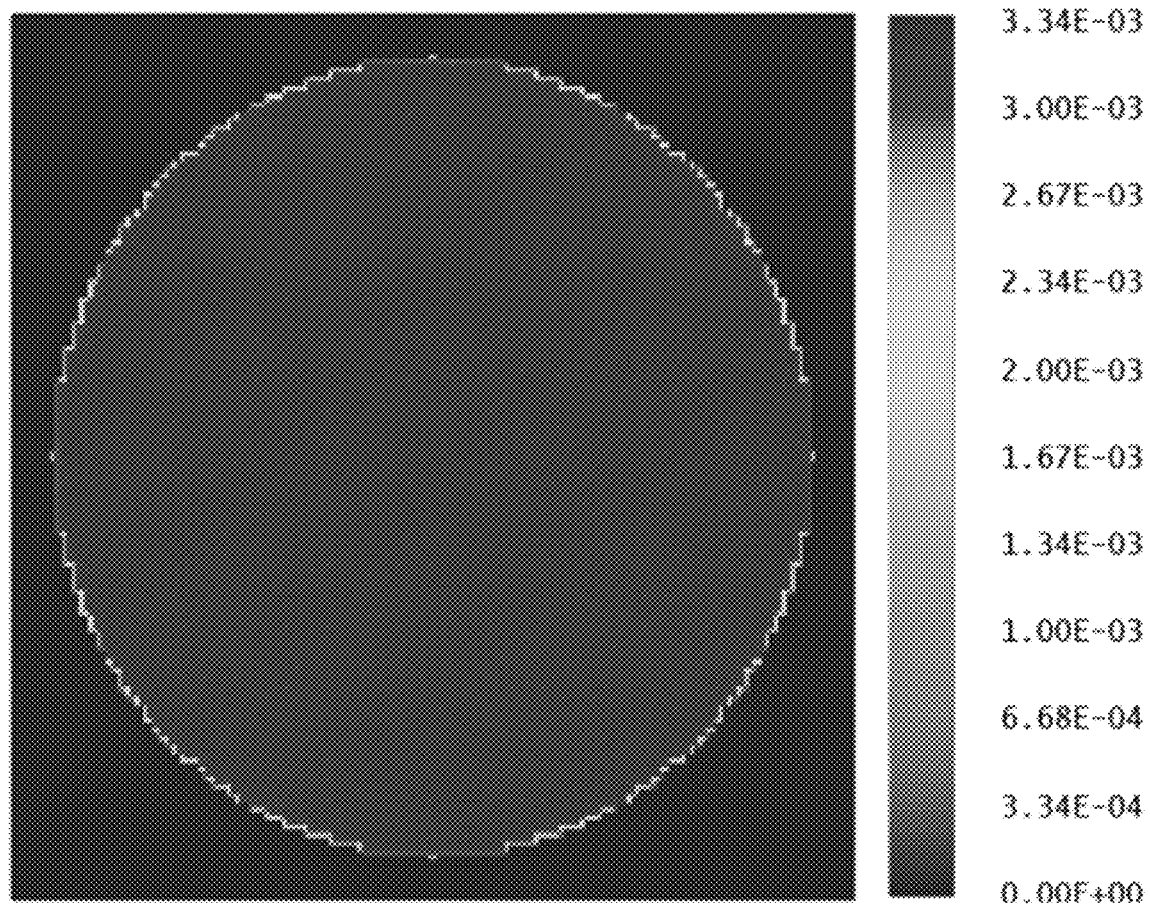
FIG. 40 is a diagram depicting geometric image analysis of the target irradiance uniformity.
Figure 41:
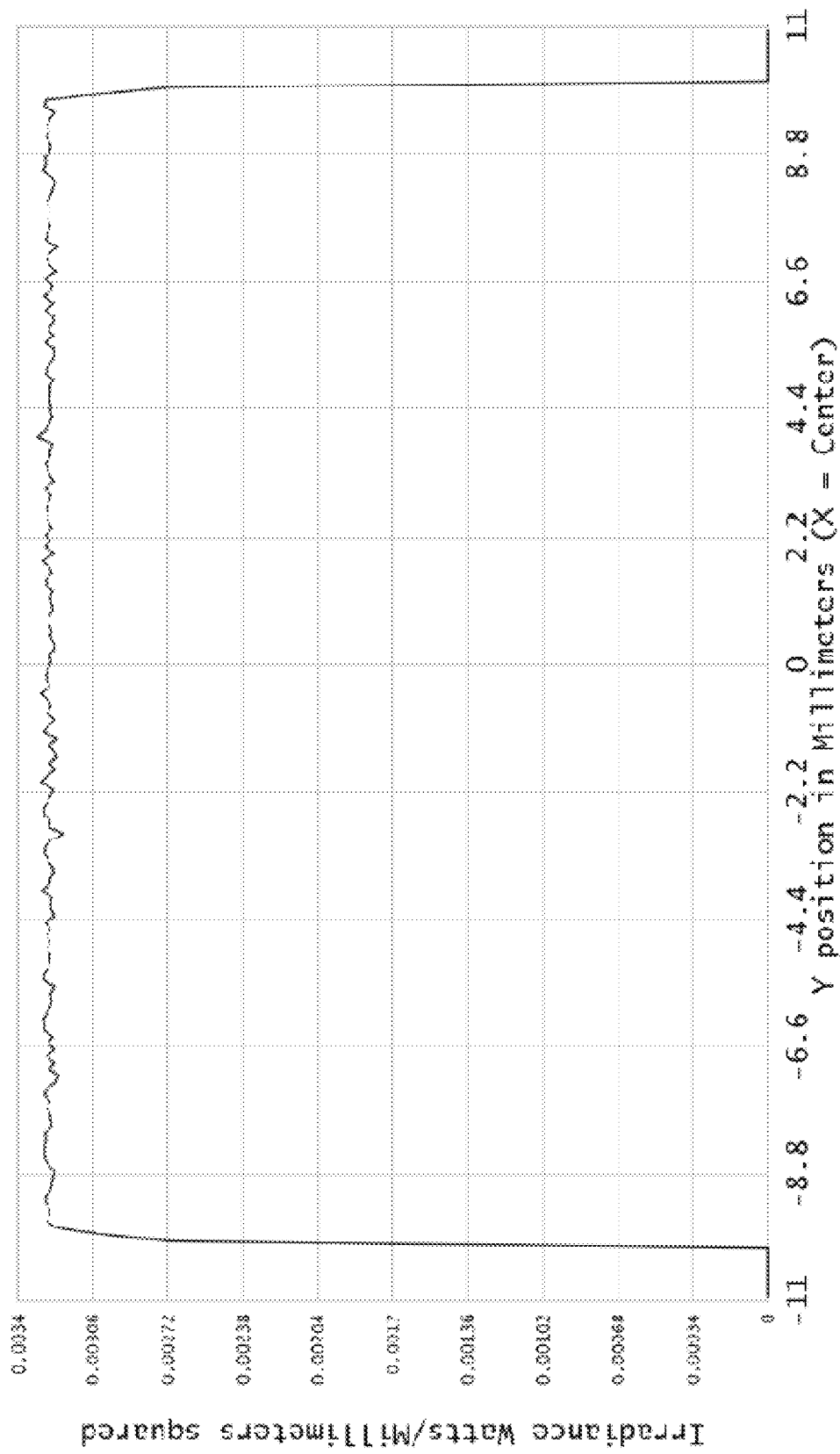
FIG. 41 is a cross image diagram depicting the irradiance uniformity of the target imaging.

FIG. 40 is a diagram depicting a geometric image analysis regarding the target irradiance uniformity when the target is imaged by the present lens system. FIG. 41 is a cross image diagram depicting the irradiance uniformity of the target imaging through the present lens system.

Figure 42:
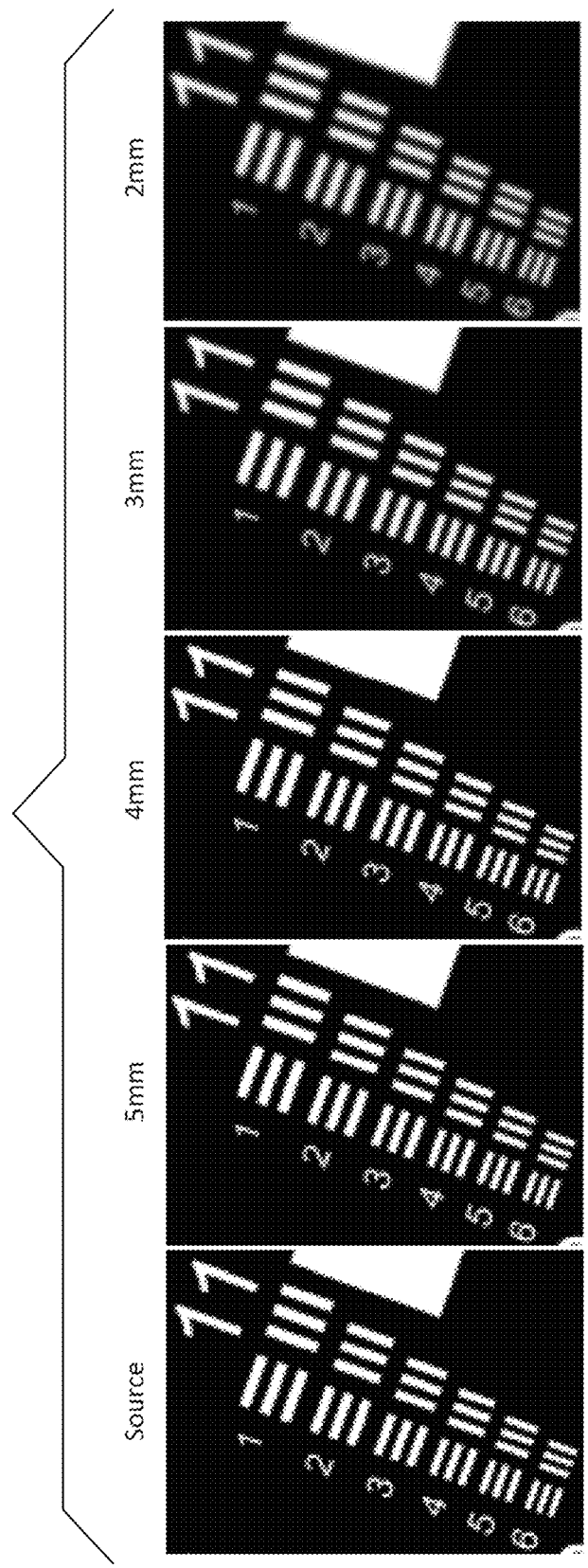
FIG. 42 is a series of cropped images of the testing results depicting a target and projected images disposed at diffraction limited angular resolution corresponding to a pupil at various sizes.

FIG. 42 is a series of cropped images of the testing results depicting a target and projected images disposed with diffraction limited angular resolution corresponding to a pupil at various sizes. In this example, a source image of the target is a 1000×1000 pixels USAF 1951 Target. The field height is 10 degrees, i.e., 100 pixels/degree. The ambient wavelengths of light are 450 nm, 520 nm and 460 nm. The diffraction limit is defined by:

$$\delta\theta = 1.22 \lambda/D$$

Assuming $\lambda=520$ nm, dB can be obtained as follows:

$1.2688\times10^{-4}$ rad for 5 mm pupil (i.e., 137.56 lp/degree)

$1.5860\times10^{-4}$ rad for 4 mm pupil (i.e., 110.05 lp/degree)

$2.1147\times10^{-4}$ rad for 3 mm pupil (i.e., 82.53 lp/degree)

$3.1720\times10^{-4}$ rad for 2 mm pupil (i.e., 55.02 lp/degree)

For the human eye, its angular spatial resolving power is about 0.0003 radians (1 arcmin), or 60 lp/degree. For a state-of-the-art XR device with 100-degree FOV and 4 k display, it has an angular resolution of 40 pixels/degree. As such, the proposed target with diffraction-limited performance is sufficient for XR metrology as well as eye-related testing applications, specifically using the same pupil sizes for the tests. The 2 mm and 3 mm pupil size images show slight blurriness compared to the source image and the 4 mm and 5 mm pupil size images. However, the angular resolutions of the 2 mm or 3 mm pupil size images are sufficient compared to the best resolution of the present XR devices as well as the human eye. In other words, with the same pupil sizes, the optical resolution of the DUT will not surpass that of the present lens system which has a diffraction-limited performance.

Figure 43:
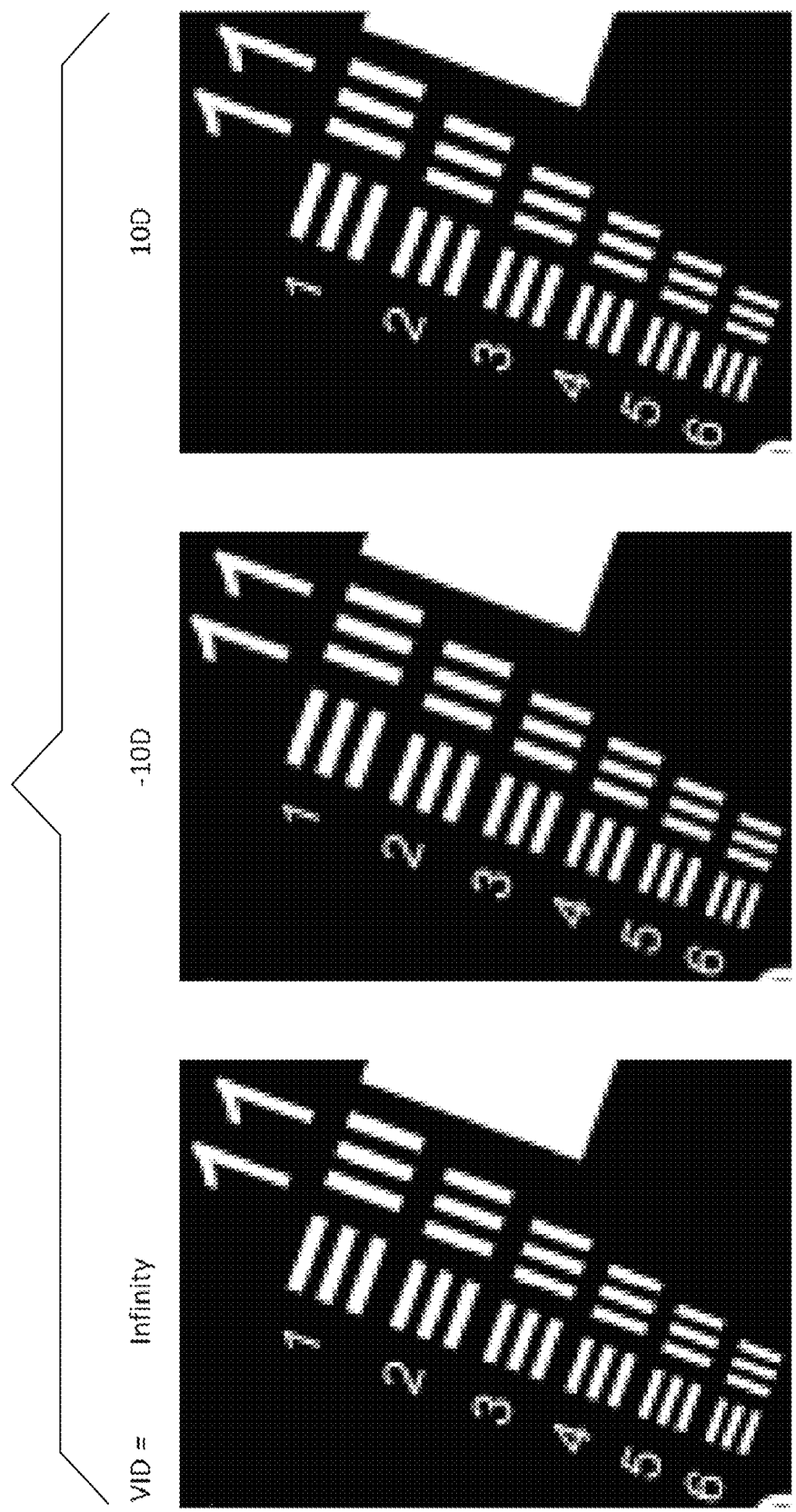
FIG. 43 depicts cropped images at different VIDs with diffraction-limited angular resolution while a pupil of diameter of 5 mm is used.
Figure 44:
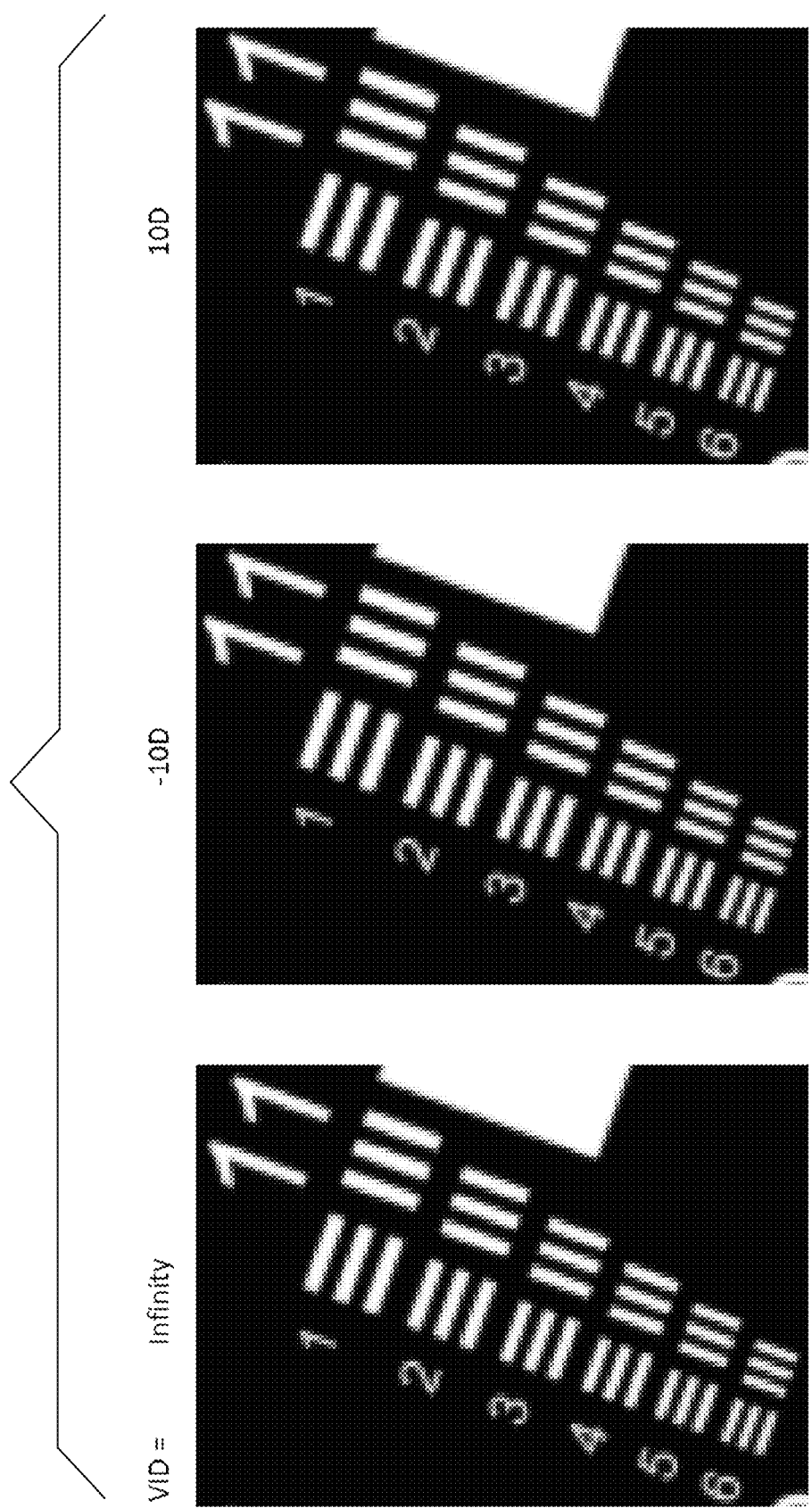
FIG. 44 depicts cropped images at different VIDs with diffraction-limited angular resolution while a pupil of diameter of 3 mm is used.

FIG. 43 depicts cropped images of several projected images at different VIDs while a pupil of 5 mm is used. The images show no difference across the whole VID range from +/−10D to infinity, which is diffraction-limited. FIG. 44 depicts projected images at different VIDs while a pupil of 3 mm is used. Again, the images show no difference across the whole VID range from +/−10D to infinity, which is diffraction-limited.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. An optical target system for a device under test (DUT) disposed in an optical path, said optical target system comprising:
   (a) a pupil;
   (b) a lens system; and
   (c) a target configured to be adjustable in position along the optical path such that the object distance of said target with respect to said lens system, is adjustable, wherein said lens system is disposed between said pupil and said target along the optical path,
   wherein a first virtual image cast behind said target is of a first size as viewed through the pupil along the optical path by the DUT when said target is disposed at a first position along the optical path, a second virtual image cast behind said target is of a second size as viewed through the pupil along the optical path by the DUT when said target is disposed at a second position along the optical path, said first virtual image and said second virtual image are disposed at an identical field of view (FOV) and said first size is different from said second size.

2. The optical target system of claim 1, further comprising a uniform light source configured to be disposed behind said target.

3. The optical target system of claim 1, wherein said lens system comprises an object-space telecentric imaging lens.

4. The optical target system of claim 1, wherein said target comprises a display.

5. The optical target system of claim 4, wherein said target is a device selected from the group consisting of a micro organic light-emitting diode (microOLED), a reflective spatial light modulator (SLM) and a transmissive SLM.

6. The optical target system of claim 1, further comprising a linear stage for receiving said target, wherein said linear stage is configured to allow adjustment of a location of said target with respect to said lens system along the optical path.

7. The optical target system of claim 6, wherein said linear stage is a motorized linear stage.

8. The optical target system of claim 1, wherein said target is configured to be removably received in a target holder.

9. The optical target system of claim 1, wherein said pupil comprises a diameter of about 2 to 5 mm.

10. The optical target system of claim 1, wherein said target is configured to be adjustable in position along the optical path in a continuously-variable manner.

11. The optical target system of claim 1, wherein the DUT is a camera.

12. The optical target system of claim 1, wherein said lens system comprises two singlets and two doublets and an optical path is configured to be formed in an order of a first of said two singlets, said two doublets and a second of said two singlets.

13. An optical target system for a device under test (DUT) disposed in an optical path, said optical target system comprising:
   (a) a pupil;
   (b) a lens system; and
   (c) a target configured to be adjustable in position along the optical path such that the object distance of said target with respect to said lens system, is adjustable, wherein said lens system is disposed between said pupil and said target along the optical path,
   wherein a first virtual image cast behind said target is of a first size as viewed through the pupil along the optical path by the DUT when said target is disposed at a first position along the optical path, a second virtual image cast behind said target is of a second size as viewed through the pupil along the optical path by the DUT when said target is disposed at a second position along the optical path, said first virtual image and said second virtual image are disposed at an identical field of view (FOV) and said first size is different from said second size and said lens system comprises two singlets and two doublets and an optical path is configured to be formed in an order of a first of said two singlets, said two doublets and a second of said two singlets.

14. The optical target system of claim 13, further comprising a uniform light source configured to be disposed behind said target.

15. The optical target system of claim 13, wherein said lens system comprises an object-space telecentric imaging lens.

16. The optical target system of claim 13, wherein said target comprises a display.

17. The optical target system of claim 16, wherein said target is a device selected from the group consisting of a micro organic light-emitting diode (microOLED), a reflective spatial light modulator (SLM) and a transmissive SLM.

18. The optical target system of claim 13, further comprising a linear stage for receiving said target, wherein said linear stage is configured to allow adjustment of a location of said target with respect to said lens system along the optical path.

19. The optical target system of claim 18, wherein said linear stage is a motorized linear stage.

20. The optical target system of claim 13, wherein said target is configured to be adjustable in position along the optical path in a continuously-variable manner.

* * * * *